(12) United States Patent
Kasada et al.

(10) Patent No.: US 10,854,230 B2
(45) Date of Patent: *Dec. 1, 2020

(54) MAGNETIC TAPE HAVING CHARACTERIZED MAGNETIC LAYER

(71) Applicant: FUJIFILM Corporation, Tokyo (JP)

(72) Inventors: Norihito Kasada, Minami-ashigara (JP); Toshio Tada, Minami-ashigara (JP); Eiki Ozawa, Minami-ashigara (JP); Takuto Kurokawa, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 150 days.

This patent is subject to a terminal disclaimer.

(21) Appl. No.: 16/038,884

(22) Filed: Jul. 18, 2018

(65) Prior Publication Data
US 2019/0027180 A1    Jan. 24, 2019

(30) Foreign Application Priority Data

Jul. 19, 2017  (JP) .................. 2017-140019
Jul. 11, 2018  (JP) .................. 2018-131331

(51) Int. Cl.
*G11B 5/706*  (2006.01)
*G11B 5/708*  (2006.01)
(Continued)

(52) U.S. Cl.
CPC ........ *G11B 5/70678* (2013.01); *G11B 5/7085* (2013.01); *G11B 5/71* (2013.01);
(Continued)

(58) Field of Classification Search
None
See application file for complete search history.

(56) References Cited

U.S. PATENT DOCUMENTS

| 3,966,686 A | 6/1976 | Asakura et al. |
| 4,112,187 A | 9/1978 | Asakura et al. |

(Continued)

FOREIGN PATENT DOCUMENTS

| DE | 101 46 429 A1 | 3/2002 |
| EP | 0 520 155 B1 | 8/1996 |

(Continued)

OTHER PUBLICATIONS

Advisory Action dated Jul. 5, 2018 in U.S. Appl. No. 14/838,663.
(Continued)

*Primary Examiner* — Kevin M Bernatz
(74) *Attorney, Agent, or Firm* — Sughrue Mion, PLLC

(57) ABSTRACT

The magnetic tape includes a magnetic layer including ferromagnetic powder, non-magnetic powder, and a binding agent and a back coating layer including non-magnetic powder and a binding agent, in which the ferromagnetic powder is ferromagnetic hexagonal ferrite powder, an Ra measured regarding a surface of the magnetic layer is equal to or smaller than 1.8 nm, an intensity ratio of a peak intensity of a diffraction peak of a (110) plane with respect to a peak intensity of a diffraction peak of a (114) plane of a hexagonal ferrite crystal structure obtained by an X-ray diffraction analysis of the magnetic layer by using an In-Plane method is 0.5 to 4.0, a vertical squareness ratio of the magnetic tape is 0.65 to 1.00, and a logarithmic decrement acquired by a pendulum viscoelasticity test performed regarding a surface of the back coating layer is equal to or smaller than 0.060.

9 Claims, 3 Drawing Sheets

(51) Int. Cl.
*G11B 5/712* (2006.01)
*G11B 5/71* (2006.01)
*G11B 5/735* (2006.01)
*G11B 5/714* (2006.01)
*G11B 5/78* (2006.01)
*G11B 5/84* (2006.01)

(52) U.S. Cl.
CPC .............. *G11B 5/712* (2013.01); *G11B 5/714* (2013.01); *G11B 5/7358* (2019.05); *G11B 5/78* (2013.01); *G11B 5/84* (2013.01)

(56) References Cited

U.S. PATENT DOCUMENTS

| | | | |
|---|---|---|---|
| 4,425,404 A | 1/1984 | Suzuki et al. | |
| 4,693,930 A | 9/1987 | Kuo et al. | |
| 4,746,569 A | 5/1988 | Takahashi et al. | |
| 4,825,317 A | 4/1989 | Rausch | |
| 5,006,406 A | 4/1991 | Kovacs | |
| 5,242,752 A | 9/1993 | Isobe et al. | |
| 5,419,938 A | 5/1995 | Kagotani et al. | |
| 5,445,881 A | 8/1995 | Irie | |
| 5,474,814 A | 12/1995 | Komatsu et al. | |
| 5,496,607 A | 3/1996 | Inaba et al. | |
| 5,540,957 A | 7/1996 | Ueda et al. | |
| 5,585,032 A | 12/1996 | Nakata et al. | |
| 5,645,917 A | 7/1997 | Ejiri et al. | |
| 5,689,384 A | 11/1997 | Albrecht et al. | |
| 5,728,454 A | 3/1998 | Inaba et al. | |
| 5,786,074 A | 7/1998 | Soui | |
| 5,827,600 A | 10/1998 | Ejiri et al. | |
| 5,835,314 A | 11/1998 | Moodera et al. | |
| 6,099,957 A | 8/2000 | Yamamoto et al. | |
| 6,183,606 B1 | 2/2001 | Kuo et al. | |
| 6,207,252 B1 | 3/2001 | Shimomura | |
| 6,228,461 B1 | 5/2001 | Sueki et al. | |
| 6,254,964 B1 | 7/2001 | Saito et al. | |
| 6,261,647 B1 | 7/2001 | Komatsu et al. | |
| 6,268,043 B1 | 7/2001 | Koizumi et al. | |
| 6,496,328 B1 | 12/2002 | Dugas | |
| 6,579,826 B2 | 6/2003 | Furuya et al. | |
| 6,649,256 B1 | 11/2003 | Buczek et al. | |
| 6,686,022 B2 | 2/2004 | Takano et al. | |
| 6,770,359 B2 | 8/2004 | Masaki | |
| 6,791,803 B2 | 9/2004 | Saito et al. | |
| 6,835,451 B2 | 12/2004 | Ejiri | |
| 6,921,592 B2 | 7/2005 | Tani et al. | |
| 6,939,606 B2 | 9/2005 | Hashimoto et al. | |
| 6,950,269 B1 | 9/2005 | Johnson | |
| 6,994,925 B2 | 2/2006 | Masaki | |
| 7,014,927 B2 | 3/2006 | Sueki et al. | |
| 7,029,726 B1 | 4/2006 | Chen et al. | |
| 7,153,366 B1 | 12/2006 | Chen et al. | |
| 7,255,908 B2 | 8/2007 | Ishikawa et al. | |
| 7,511,907 B2 | 3/2009 | Dugas et al. | |
| 7,515,383 B2 | 4/2009 | Saito et al. | |
| 7,656,602 B2 | 2/2010 | Iben et al. | |
| 7,803,471 B1 | 9/2010 | Ota et al. | |
| 7,839,599 B2 | 11/2010 | Bui et al. | |
| 8,000,057 B2 | 8/2011 | Bui et al. | |
| 8,318,242 B2 | 11/2012 | Bradshaw et al. | |
| 8,524,108 B2 | 9/2013 | Hattori | |
| 8,535,817 B2 * | 9/2013 | Imaoka | G11B 5/70 428/844 |
| 8,576,510 B2 | 11/2013 | Cherubini et al. | |
| 8,681,451 B2 | 3/2014 | Harasawa et al. | |
| 9,105,294 B2 | 8/2015 | Jensen et al. | |
| 9,159,341 B2 | 10/2015 | Bradshaw et al. | |
| 9,311,946 B2 | 4/2016 | Tanaka et al. | |
| 9,324,343 B2 | 4/2016 | Bradshaw et al. | |
| 9,495,985 B2 | 11/2016 | Biskeborn et al. | |
| 9,530,444 B2 | 12/2016 | Kasada | |
| 9,542,967 B2 | 1/2017 | Sekiguchi et al. | |
| 9,564,161 B1 | 2/2017 | Cherubini et al. | |
| 9,601,146 B2 | 3/2017 | Kasada et al. | |
| 9,704,425 B2 | 7/2017 | Zhang et al. | |
| 9,704,525 B2 | 7/2017 | Kasada | |
| 9,704,527 B2 | 7/2017 | Kasada | |
| 9,711,174 B2 | 7/2017 | Kasada et al. | |
| 9,721,605 B2 | 8/2017 | Oyanagi et al. | |
| 9,721,606 B2 | 8/2017 | Kasada | |
| 9,721,607 B2 | 8/2017 | Tada et al. | |
| 9,748,026 B2 | 8/2017 | Shirata | |
| 9,773,519 B2 | 9/2017 | Kasada et al. | |
| 9,779,772 B1 | 10/2017 | Kasada et al. | |
| 9,837,104 B2 | 12/2017 | Biskeborn | |
| 9,837,116 B2 | 12/2017 | Ozawa et al. | |
| 9,959,894 B2 | 5/2018 | Omura | |
| 9,972,351 B1 | 5/2018 | Kaneko et al. | |
| 9,978,414 B1 | 5/2018 | Kaneko et al. | |
| 9,984,710 B2 * | 5/2018 | Kasada | G11B 5/68 |
| 9,984,712 B1 | 5/2018 | Ozawa | |
| 9,984,716 B1 | 5/2018 | Kaneko et al. | |
| 10,008,230 B1 | 6/2018 | Ozawa et al. | |
| 10,026,430 B2 | 7/2018 | Kasada et al. | |
| 10,026,433 B2 | 7/2018 | Kasada et al. | |
| 10,026,434 B2 | 7/2018 | Oyanagi et al. | |
| 10,026,435 B2 * | 7/2018 | Kasada | G11B 5/70 |
| 10,062,403 B1 | 8/2018 | Kasada et al. | |
| 10,074,393 B2 | 9/2018 | Kaneko et al. | |
| 10,134,433 B2 | 11/2018 | Kasada et al. | |
| 10,170,144 B2 | 1/2019 | Ozawa et al. | |
| 10,366,721 B2 * | 7/2019 | Kasada | G11B 20/1201 |
| 10,375,639 B2 * | 8/2019 | Tsukamoto | H04W 52/0261 |
| 10,403,314 B2 * | 9/2019 | Kasada | G11B 5/78 |
| 10,403,316 B2 * | 9/2019 | Kasada | G11B 5/00817 |
| 10,403,317 B2 * | 9/2019 | Kasada | G11B 5/70 |
| 10,410,665 B2 * | 9/2019 | Ozawa | G11B 5/00813 |
| 10,410,666 B2 * | 9/2019 | Kasada | G11B 5/82 |
| 10,424,330 B2 * | 9/2019 | Kasada | G11B 5/712 |
| 10,438,621 B2 * | 10/2019 | Kasada | G11B 5/78 |
| 10,475,480 B2 * | 11/2019 | Kurokawa | G11B 5/71 |
| 10,515,661 B2 * | 12/2019 | Kasada | G11B 5/584 |
| 10,529,368 B2 * | 1/2020 | Kasada | G11B 5/78 |
| 10,546,602 B2 * | 1/2020 | Kasada | G11B 5/3903 |
| 10,546,605 B2 * | 1/2020 | Ozawa | G11B 5/70 |
| 10,643,647 B2 * | 5/2020 | Kasada | G11B 5/00817 |
| 2001/0038928 A1 | 11/2001 | Nakamigawa et al. | |
| 2001/0053458 A1 | 12/2001 | Suzuki et al. | |
| 2002/0072472 A1 | 7/2002 | Furuya et al. | |
| 2002/0122339 A1 | 9/2002 | Takano et al. | |
| 2003/0059649 A1 | 3/2003 | Saliba et al. | |
| 2003/0091866 A1 | 5/2003 | Ejiri et al. | |
| 2003/0124386 A1 | 7/2003 | Masaki | |
| 2003/0128453 A1 | 7/2003 | Saito et al. | |
| 2003/0170498 A1 | 9/2003 | Inoue | |
| 2003/0228492 A1 | 12/2003 | Ejiri et al. | |
| 2003/0228493 A1 | 12/2003 | Doushita et al. | |
| 2004/0018388 A1 | 1/2004 | Kitamura et al. | |
| 2004/0053074 A1 | 3/2004 | Jingu et al. | |
| 2004/0072025 A1 | 4/2004 | Kishimoto et al. | |
| 2004/0197605 A1 | 10/2004 | Seki et al. | |
| 2004/0213948 A1 | 10/2004 | Saito et al. | |
| 2004/0218304 A1 | 11/2004 | Goker et al. | |
| 2004/0265643 A1 | 12/2004 | Ejiri | |
| 2005/0057838 A1 | 3/2005 | Ohtsu | |
| 2005/0153170 A1 | 7/2005 | Inoue et al. | |
| 2005/0196645 A1 | 9/2005 | Doi et al. | |
| 2005/0260456 A1 | 11/2005 | Hanai et al. | |
| 2005/0260459 A1 | 11/2005 | Hanai et al. | |
| 2005/0264935 A1 | 12/2005 | Sueki et al. | |
| 2006/0008681 A1 | 1/2006 | Hashimoto et al. | |
| 2006/0035114 A1 | 2/2006 | Kuse et al. | |
| 2006/0056095 A1 | 3/2006 | Saitou | |
| 2006/0068232 A1 | 3/2006 | Mikamo et al. | |
| 2006/0187589 A1 | 8/2006 | Harasawa et al. | |
| 2006/0232883 A1 | 10/2006 | Biskeborn et al. | |
| 2007/0009769 A1 | 1/2007 | Kanazawa | |
| 2007/0020489 A1 | 1/2007 | Yamazaki et al. | |
| 2007/0020490 A1 | 1/2007 | Harasawa et al. | |
| 2007/0224456 A1 | 9/2007 | Murao et al. | |
| 2007/0230054 A1 | 10/2007 | Takeda et al. | |
| 2007/0231606 A1 | 10/2007 | Hanai | |
| 2008/0057351 A1 | 3/2008 | Meguro et al. | |

(56) References Cited

U.S. PATENT DOCUMENTS

| | | |
|---|---|---|
| 2008/0144211 A1 | 6/2008 | Weber et al. |
| 2008/0152956 A1 | 6/2008 | Murayama et al. |
| 2008/0174897 A1 | 7/2008 | Bates et al. |
| 2008/0297950 A1 | 12/2008 | Noguchi et al. |
| 2008/0311308 A1 | 12/2008 | Lee et al. |
| 2009/0027812 A1 | 1/2009 | Noguchi et al. |
| 2009/0087689 A1 | 4/2009 | Doushita et al. |
| 2009/0161249 A1 | 6/2009 | Takayama et al. |
| 2009/0162701 A1 | 6/2009 | Jensen et al. |
| 2010/0000966 A1 | 1/2010 | Kamata et al. |
| 2010/0035086 A1 | 2/2010 | Inoue et al. |
| 2010/0035088 A1 | 2/2010 | Inoue |
| 2010/0053810 A1 | 3/2010 | Biskeborn et al. |
| 2010/0073816 A1 | 3/2010 | Komori et al. |
| 2010/0081011 A1 | 4/2010 | Nakamura |
| 2010/0134929 A1 | 6/2010 | Ito |
| 2010/0227201 A1 | 9/2010 | Sasaki et al. |
| 2010/0246073 A1 | 9/2010 | Katayama |
| 2011/0003241 A1 | 1/2011 | Kaneko et al. |
| 2011/0051280 A1 | 3/2011 | Karp et al. |
| 2011/0052908 A1 | 3/2011 | Imaoka |
| 2011/0077902 A1 | 3/2011 | Awezec et al. |
| 2011/0151281 A1 | 6/2011 | Inoue |
| 2011/0244272 A1 | 10/2011 | Suzuki et al. |
| 2012/0045664 A1 | 2/2012 | Tanaka et al. |
| 2012/0152891 A1 | 6/2012 | Brown et al. |
| 2012/0177951 A1 | 7/2012 | Yamazaki et al. |
| 2012/0183811 A1 | 7/2012 | Hattori et al. |
| 2012/0196156 A1 | 8/2012 | Suzuki |
| 2012/0243120 A1 | 9/2012 | Harasawa et al. |
| 2012/0244387 A1 | 9/2012 | Mori et al. |
| 2012/0251845 A1 | 10/2012 | Wang et al. |
| 2013/0029183 A1 | 1/2013 | Omura et al. |
| 2013/0084470 A1 | 4/2013 | Hattori et al. |
| 2013/0088794 A1 | 4/2013 | Cherubini et al. |
| 2013/0256584 A1 | 10/2013 | Yamazaki et al. |
| 2013/0260179 A1 | 10/2013 | Kasada et al. |
| 2013/0279040 A1 | 10/2013 | Cideciyan et al. |
| 2013/0286510 A1 | 10/2013 | Rothermel et al. |
| 2014/0011055 A1 | 1/2014 | Suzuki et al. |
| 2014/0130067 A1 | 5/2014 | Madison et al. |
| 2014/0139944 A1 | 5/2014 | Johnson et al. |
| 2014/0272474 A1 | 9/2014 | Kasada |
| 2014/0295214 A1 | 10/2014 | Tada et al. |
| 2014/0342189 A1 | 11/2014 | Tachibana et al. |
| 2014/0366990 A1 | 12/2014 | Lai et al. |
| 2014/0374645 A1 | 12/2014 | Kikuchi et al. |
| 2015/0043101 A1 | 2/2015 | Biskeborn et al. |
| 2015/0098149 A1 | 4/2015 | Bates et al. |
| 2015/0111066 A1 | 4/2015 | Terakawa et al. |
| 2015/0123026 A1 | 5/2015 | Masada et al. |
| 2015/0302879 A1 | 10/2015 | Holmberg et al. |
| 2015/0380036 A1 | 12/2015 | Kasada et al. |
| 2016/0061447 A1 | 3/2016 | Kobayashi |
| 2016/0064025 A1 | 3/2016 | Kurokawa et al. |
| 2016/0092315 A1 | 3/2016 | Ashida et al. |
| 2016/0093321 A1 | 3/2016 | Aoshima et al. |
| 2016/0093322 A1 | 3/2016 | Kasada et al. |
| 2016/0093323 A1 | 3/2016 | Omura |
| 2016/0180875 A1 | 6/2016 | Tanaka et al. |
| 2016/0189739 A1 | 6/2016 | Kasada et al. |
| 2016/0189740 A1 | 6/2016 | Oyanagi et al. |
| 2016/0247530 A1 | 8/2016 | Kasada |
| 2016/0260449 A1 | 9/2016 | Ahmad et al. |
| 2016/0276076 A1 | 9/2016 | Kasada |
| 2017/0032812 A1 | 2/2017 | Kasada |
| 2017/0053669 A1 | 2/2017 | Kasada |
| 2017/0053670 A1 | 2/2017 | Oyanagi et al. |
| 2017/0053671 A1 | 2/2017 | Kasada et al. |
| 2017/0058227 A1 | 3/2017 | Kondo et al. |
| 2017/0092315 A1 | 3/2017 | Ozawa et al. |
| 2017/0130156 A1 | 5/2017 | Kondo et al. |
| 2017/0178675 A1 | 6/2017 | Kasada |
| 2017/0178676 A1 | 6/2017 | Kasada |
| 2017/0178677 A1 | 6/2017 | Kasada |
| 2017/0186456 A1 | 6/2017 | Tada et al. |
| 2017/0186460 A1 | 6/2017 | Kasada et al. |
| 2017/0221513 A1 | 8/2017 | Hiroi et al. |
| 2017/0221516 A1 | 8/2017 | Oyanagi et al. |
| 2017/0221517 A1 | 8/2017 | Ozawa et al. |
| 2017/0249963 A1 | 8/2017 | Oyanagi et al. |
| 2017/0249964 A1 | 8/2017 | Kasada et al. |
| 2017/0249965 A1 | 8/2017 | Kurokawa et al. |
| 2017/0249966 A1 | 8/2017 | Tachibana et al. |
| 2017/0287517 A1 | 10/2017 | Hosoya et al. |
| 2017/0355022 A1 | 12/2017 | Kaneko et al. |
| 2017/0358318 A1 | 12/2017 | Kasada et al. |
| 2017/0372726 A1 | 12/2017 | Kasada et al. |
| 2017/0372727 A1 | 12/2017 | Kasada et al. |
| 2017/0372736 A1 | 12/2017 | Kaneko et al. |
| 2017/0372737 A1 | 12/2017 | Oyanagi et al. |
| 2017/0372738 A1 | 12/2017 | Kasada |
| 2017/0372739 A1 | 12/2017 | Ozawa et al. |
| 2017/0372740 A1 | 12/2017 | Ozawa et al. |
| 2017/0372741 A1 | 12/2017 | Kurokawa et al. |
| 2017/0372742 A1 | 12/2017 | Kaneko et al. |
| 2017/0372743 A1 | 12/2017 | Kasada et al. |
| 2017/0372744 A1 | 12/2017 | Ozawa et al. |
| 2018/0061446 A1 | 3/2018 | Kasada |
| 2018/0061447 A1 | 3/2018 | Kasada |
| 2018/0082710 A1* | 3/2018 | Tada .................... G11B 5/7085 |
| 2018/0137887 A1 | 5/2018 | Sekiguchi et al. |
| 2018/0182417 A1 | 6/2018 | Kaneko et al. |
| 2018/0182422 A1 | 6/2018 | Kawakami et al. |
| 2018/0182425 A1 | 6/2018 | Kasada et al. |
| 2018/0182426 A1 | 6/2018 | Ozawa et al. |
| 2018/0182427 A1 | 6/2018 | Kasada et al. |
| 2018/0182428 A1 | 6/2018 | Kasada et al. |
| 2018/0182429 A1 | 6/2018 | Kasada et al. |
| 2018/0182430 A1 | 6/2018 | Ozawa et al. |
| 2018/0240475 A1 | 8/2018 | Kasada |
| 2018/0240476 A1 | 8/2018 | Kasada et al. |
| 2018/0240478 A1 | 8/2018 | Kasada et al. |
| 2018/0240479 A1 | 8/2018 | Kasada et al. |
| 2018/0240481 A1 | 8/2018 | Kasada et al. |
| 2018/0240488 A1 | 8/2018 | Kasada |
| 2018/0240489 A1 | 8/2018 | Kasada et al. |
| 2018/0240490 A1 | 8/2018 | Kurokawa et al. |
| 2018/0240491 A1 | 8/2018 | Ozawa et al. |
| 2018/0240492 A1 | 8/2018 | Kasada |
| 2018/0240493 A1 | 8/2018 | Tada et al. |
| 2018/0240494 A1 | 8/2018 | Kurokawa et al. |
| 2018/0240495 A1 | 8/2018 | Kasada |
| 2018/0286439 A1 | 10/2018 | Ozawa et al. |
| 2018/0286442 A1 | 10/2018 | Ozawa et al. |
| 2018/0286443 A1 | 10/2018 | Ozawa et al. |
| 2018/0286444 A1 | 10/2018 | Kasada et al. |
| 2018/0286446 A1* | 10/2018 | Ozawa .................... G11B 5/712 |
| 2018/0286447 A1 | 10/2018 | Ozawa et al. |
| 2018/0286448 A1 | 10/2018 | Ozawa et al. |
| 2018/0286449 A1 | 10/2018 | Kasada et al. |
| 2018/0286450 A1 | 10/2018 | Kasada et al. |
| 2018/0286451 A1 | 10/2018 | Ozawa et al. |
| 2018/0286452 A1 | 10/2018 | Ozawa et al. |
| 2018/0286453 A1 | 10/2018 | Kasada et al. |
| 2018/0301165 A1 | 10/2018 | Oyanagi et al. |
| 2018/0350398 A1 | 12/2018 | Kawakami et al. |
| 2018/0350400 A1 | 12/2018 | Kaneko et al. |
| 2018/0358042 A1 | 12/2018 | Kasada et al. |
| 2018/0374507 A1 | 12/2018 | Kasada |
| 2019/0027167 A1* | 1/2019 | Tada ........................ G11B 5/70 |
| 2019/0027168 A1* | 1/2019 | Kasada ................ G11B 5/7085 |
| 2019/0027171 A1* | 1/2019 | Kasada .............. G11B 5/70678 |
| 2019/0027172 A1* | 1/2019 | Kasada .................... G11B 5/735 |
| 2019/0027174 A1* | 1/2019 | Tada ...................... G11B 5/735 |
| 2019/0027175 A1* | 1/2019 | Kurokawa .............. G11B 5/716 |
| 2019/0027176 A1* | 1/2019 | Kurokawa ......... G11B 5/70678 |
| 2019/0027177 A1 | 1/2019 | Kasada |
| 2019/0027178 A1* | 1/2019 | Kasada .................... G11B 5/70 |
| 2019/0027179 A1* | 1/2019 | Ozawa .................... G11B 5/70 |
| 2019/0027181 A1* | 1/2019 | Ozawa .................... G11B 5/71 |
| 2019/0035424 A1 | 1/2019 | Endo |
| 2019/0051325 A1 | 2/2019 | Kasada et al. |
| 2019/0088278 A1 | 3/2019 | Kasada et al. |

(56) References Cited

U.S. PATENT DOCUMENTS

| | | | |
|---|---|---|---|
| 2019/0096437 A1 | 3/2019 | Ozawa et al. | |
| 2019/0103130 A1 | 4/2019 | Kasada et al. | |
| 2019/0103131 A1* | 4/2019 | Kasada | G11B 5/00813 |
| 2019/0103133 A1* | 4/2019 | Ozawa | G11B 5/712 |
| 2019/0103134 A1* | 4/2019 | Kasada | G11B 5/72 |
| 2019/0103135 A1* | 4/2019 | Ozawa | G11B 5/78 |
| 2019/0130936 A1 | 5/2019 | Kaneko et al. | |
| 2019/0259416 A1 | 8/2019 | Kawakami et al. | |
| 2019/0295587 A1 | 9/2019 | Kasada | |
| 2019/0295590 A1 | 9/2019 | Kaneko et al. | |
| 2019/0304496 A1 | 10/2019 | Fujimoto | |
| 2020/0005814 A1 | 1/2020 | Kasada et al. | |
| 2020/0005818 A1 | 1/2020 | Kasada et al. | |
| 2020/0005822 A1* | 1/2020 | Kasada | G11B 5/70678 |
| 2020/0035262 A1 | 1/2020 | Kasada | |

FOREIGN PATENT DOCUMENTS

| | | |
|---|---|---|
| GB | 2495356 A | 4/2013 |
| JP | 61-11924 A | 1/1986 |
| JP | 61-139923 A | 6/1986 |
| JP | 61-139932 A | 6/1986 |
| JP | 63-129519 A | 6/1988 |
| JP | 63-249932 A | 10/1988 |
| JP | 63-298813 A | 12/1988 |
| JP | 64-057422 A | 3/1989 |
| JP | 64-060819 A | 3/1989 |
| JP | 1-276424 A | 11/1989 |
| JP | 2-227821 A | 9/1990 |
| JP | 5-258283 A | 10/1993 |
| JP | 5-298653 A | 11/1993 |
| JP | 7-57242 A | 3/1995 |
| JP | 9-73626 A | 3/1997 |
| JP | 11-110743 A | 4/1999 |
| JP | 11-175949 A | 7/1999 |
| JP | 11-259849 A | 9/1999 |
| JP | 11-273051 A | 10/1999 |
| JP | 2000-251240 A | 9/2000 |
| JP | 2002-157726 A | 5/2002 |
| JP | 2002-298332 A | 10/2002 |
| JP | 2002-329605 A | 11/2002 |
| JP | 2002-367142 A | 12/2002 |
| JP | 2002-367318 A | 12/2002 |
| JP | 2003-77116 A | 3/2003 |
| JP | 2003-323710 A | 11/2003 |
| JP | 2004-5793 A | 1/2004 |
| JP | 2004-005820 A | 1/2004 |
| JP | 2004-103186 A | 4/2004 |
| JP | 2004-114492 A | 4/2004 |
| JP | 2004-133997 A | 4/2004 |
| JP | 2004-185676 A | 7/2004 |
| JP | 2005-038579 A | 2/2005 |
| JP | 2005-092967 A | 4/2005 |
| JP | 2005-243063 A | 9/2005 |
| JP | 2005-243162 A | 9/2005 |
| JP | 2006-92672 A | 4/2006 |
| JP | 2006-286114 A | 10/2006 |
| JP | 2007-265555 A | 10/2007 |
| JP | 2007-273039 A | 10/2007 |
| JP | 2007-287310 A | 11/2007 |
| JP | 2007-297427 A | 11/2007 |
| JP | 2007-305197 A | 11/2007 |
| JP | 2008-047276 A | 2/2008 |
| JP | 2008-243317 A | 10/2008 |
| JP | 2009-245515 A | 10/2009 |
| JP | 2009-283082 A | 12/2009 |
| JP | 2010-036350 A | 2/2010 |
| JP | 2010-49731 A | 3/2010 |
| JP | 2011-48878 A | 3/2011 |
| JP | 2011-138566 A | 7/2011 |
| JP | 2011-187142 A | 9/2011 |
| JP | 2011-210288 A | 10/2011 |
| JP | 2011-225417 A | 11/2011 |
| JP | 2012-38367 A | 2/2012 |
| JP | 2012-043495 A | 3/2012 |
| JP | 2012-203955 A | 10/2012 |
| JP | 2013-25853 A | 2/2013 |
| JP | 2013-77360 A | 4/2013 |
| JP | 2013-164889 A | 8/2013 |
| JP | 2014-15453 A | 1/2014 |
| JP | 2014-179149 A | 9/2014 |
| JP | 2015-39801 A | 3/2015 |
| JP | 2015-111484 A | 6/2015 |
| JP | 2016-15183 A | 1/2016 |
| JP | 2016-502224 A | 1/2016 |
| JP | 2016-051493 A | 4/2016 |
| JP | 2016-071912 A | 5/2016 |
| JP | 2016-71926 A | 5/2016 |
| JP | 2016-126817 A | 7/2016 |
| JP | 2016-139451 A | 8/2016 |
| JP | 2016-177851 A | 10/2016 |
| JP | 2017-041291 A | 2/2017 |

OTHER PUBLICATIONS

Office Action dated Apr. 26, 2017 which issued during the prosecution of U.S. Appl. No. 15/388,864.

Office Action dated Aug. 10, 2017, which issued during the prosecution of U.S. Appl. No. 14/870,618.

Office Action dated Aug. 3, 2018 which issued during the prosecution of U.S. Appl. No. 15/388,911.

Office Action dated Feb. 4, 2016 which issued during the prosecution of U.S. Appl. No. 14/753,227.

Office Action dated Jun. 7, 2018 which issued during the prosecution of U.S. Appl. No. 15/380,309.

Office Action dated May 2, 2018, which issued during the prosecution of U.S. Appl. No. 15/280,195.

Office Action dated May 4, 2018, which issued during the prosecution of U.S. Appl. No. 15/422,944.

Office Action dated May 4, 2018, which issued during the prosecution of U.S. Appl. No. 15/625,428.

Office Action dated May 7, 2018, which issued during the prosecution of U.S. Appl. No. 15/624,792.

Office Action dated May 7, 2018, which issued during the prosecution of U.S. Appl. No. 15/624,897.

Office Action dated May 7, 2018, which issued during the prosecution of U.S. Appl. No. 15/626,832.

Office Action dated Nov. 16, 2016 which issued during the prosecution of U.S. Appl. No. 15/072,550.

Office Action dated Oct. 12, 2018, which issued during the prosecution of U.S. Appl. No. 15/626,355.

Office Action dated Oct. 12, 2018, which issued during the prosecution of U.S. Appl. No. 15/627,696.

Office Action dated Oct. 15, 2018, which issued during the prosecution of U.S. Appl. No. 15/619,012.

Office Action dated Oct. 22, 2018, which issued during the prosecution of U.S. Appl. No. 15/854,439.

Office Action dated Oct. 9, 2018, which issued during the prosecution of U.S. Appl. No. 15/628,814.

Office Action dated Sep. 24, 2018, which issued during the prosecution of U.S. Appl. No. 15/690,400.

Office Action dated Sep. 27, 2018, which issued during the prosecution of U.S. Appl. No. 15/690,906.

Office Action dated Sep. 27, 2018, which issued during the prosecution of U.S. Appl. No. 15/854,383.

Office Action dated Aug. 23, 2018 from the United States Patent and Trademark Office in U.S. Appl. No. 15/614,876.

Office Action dated Aug. 23, 2018 from the United States Patent and Trademark Office in U.S. Appl. No. 15/621,464.

Office Action dated Aug. 23, 2018 from the United States Patent and Trademark Office in U.S. Appl. No. 15/626,720.

Office Action dated Aug. 24, 2018 from the United States Patent and Trademark Office in U.S. Appl. No. 15/620,916.

Office Action dated Aug. 3, 2018 from the United States Patent and Trademark Office in U.S. Appl. No. 15/380,336.

Office Action dated Dec. 5, 2016 from the United States Patent and Trademark Office in U.S. Appl. No. 14/978,834.

(56) References Cited

OTHER PUBLICATIONS

Office Action dated Dec. 6, 2016 from the United States Patent and Trademark Office in U.S. Appl. No. 14/757,555.
Office Action dated Jun. 9, 2017 which issued during the prosecution of U.S. Appl. No. 15/388,864.
Office Action dated May 30, 2018 which issued during the prosecution of U.S. Appl. No. 15/388,911.
Office Action dated Nov. 18, 2016 which issued during the prosecution of U.S. Appl. No. 14/753,227.
Office Action dated Aug. 15, 2016 which issued during the prosecution of U.S. Appl. No. 14/753,227.
"Introduction to TMR Magnetic Sensors", Anonymous, Mar. 12, 2015, MR Sensor Technology, pp. 1-5 (Year: 2015).
Notice of Allowance dated Apr. 25, 2017 which issued during the prosecution of U.S. Appl. No. 15/072,550.
Notice of Allowance dated Apr. 27, 2017, which issued during the prosecution of U.S. Appl. No. 15/052,115.
Notice of Allowance dated Apr. 5, 2018, which issued during the prosecution of U.S. Appl. No. 14/867,752.
Notice of Allowance dated Aug. 28, 2018 from the US Patent & Trademark Office in U.S. Appl. No. 15/422,821.
Notice of Allowance dated Aug. 30, 2017, which issued during the prosecution of U.S. Appl. No. 15/466,143.
Notice of Allowance dated Aug. 6, 2018, which issued during the prosecution of U.S. Appl. No. 15/920,768.
Notice of Allowance dated Aug. 9, 2018, which issued during the prosecution of U.S. Appl. No. 15/920,563.
Notice of Allowance dated Dec. 2, 2016 which issued during the prosecution of U.S. Appl. No. 14/753,227.
Notice of Allowance dated Dec. 3, 2018, which issued during the prosecution of U.S. Appl. No. 15/920,518.
Notice of Allowance dated Dec. 4, 2018, which issued during the prosecution of U.S. Appl. No. 15/625,428.
Notice of Allowance dated Feb. 14, 2018, which issued during the prosecution of U.S. Appl. No. 14/870,618.
Notice of Allowance dated Jul. 12, 2017 which issued during the prosecution of U.S. Appl. No. 15/388,864.
Notice of Allowance dated Jul. 13, 2018, which issued during the prosecution of U.S. Appl. No. 15/920,782.
Notice of Allowance dated Jun. 2, 2017, which issued during the prosecution of U.S. Appl. No. 15/218,190.
Notice of Allowance dated Jun. 28, 2017, which issued during the prosecution of U.S. Appl. No. 15/464,991.
Notice of Allowance dated Mar. 14, 2018, which issued during the prosecution of U.S. Appl. No. 15/854,474.
Notice of Allowance dated Mar. 16, 2018 which issued during the prosecution of U.S. Appl. No. 15/854,410.
Notice of Allowance dated May 10, 2018 which issued during the prosecution of U.S. Appl. No. 15/615,871.
Notice of Allowance dated May 8, 2017, which issued during the prosecution of U.S. Appl. No. 14/757,555.
Notice of Allowance dated May 8, 2017, which issued during the prosecution of U.S. Appl. No. 14/978,834.
Notice of Allowance dated Oct. 11, 2018, which issued during the prosecution of U.S. Appl. No. 15/380,336.
Notice of Allowance dated Oct. 11, 2018, which issued during the prosecution of U.S. Appl. No. 15/422,944.
Notice of Allowance dated Oct. 11, 2018, which issued during the prosecution of U.S. Appl. No. 15/624,792.
Notice of Allowance dated Oct. 11, 2018, which issued during the prosecution of U.S. Appl. No. 15/624,897.
Notice of Allowance dated Oct. 12, 2018, which issued during the prosecution of U.S. Appl. No. 15/626,832.
Notice of Allowance dated Oct. 6, 2016, which issued during the prosecution of U.S. Appl. No. 14/209,065.
Notice of Allowance dated Sep. 24, 2018, which issued during the prosecution of U.S. Appl. No. 15/854,438.
Notice of Allowance dated Sep. 4, 2018, which issued during the prosecution of U.S. Appl. No. 15/625,428.
Notice of Allowance dated Apr. 16, 2019 in U.S. Appl. No. 15/625,428.
Notice of Allowance dated Apr. 30, 2019 in U.S. Appl. No. 15/380,309.
Notice of Allowance dated Aug. 27, 2018 in U.S. Appl. No. 15/920,635.
Notice of Allowance dated Jan. 10, 2019 in U.S. Appl. No. 15/848,173.
Notice of Allowance dated Jan. 17, 2019 in U.S. Appl. No. 15/422,944.
Notice of Allowance dated Jan. 17, 2019 in U.S. Appl. No. 15/626,720.
Notice of Allowance dated Jan. 30, 2019 in U.S. Appl. No. 15/854,409.
Notice of Allowance dated Jul. 16, 2019 in U.S. Appl. No. 15/900,144.
Notice of Allowance dated Jul. 31, 2019 in U.S. Appl. No. 16/100,289.
Notice of Allowance dated Jul. 31, 2019 in U.S. Appl. No. 16/143,646.
Notice of Allowance dated Jun. 25, 2019 in U.S. Appl. No. 15/620,916.
Notice of Allowance dated Jun. 27, 2019 in U.S. Appl. No. 15/854,439.
Notice of Allowance dated Jun. 6, 2019 in U.S. Appl. No. 15/854,383.
Notice of Allowance dated Mar. 13, 2019 in U.S. Appl. No. 16/100,289.
Notice of Allowance dated Mar. 14, 2018 in U.S. Appl. No. 15/854,329.
Notice of Allowance dated Mar. 18, 2019 in U.S. Appl. No. 15/626,355.
Notice of Allowance dated Mar. 18, 2019 in U.S. Appl. No. 15/628,814.
Notice of Allowance dated Mar. 5, 2019 in U.S. Appl. No. 16/009,603.
Notice of Allowance dated May 13, 2019 in U.S. Appl. No. 15/900,379.
Notice of Allowance dated May 14, 2019 in U.S. Appl. No. 15/422,821.
Notice of Allowance dated May 14, 2019 in U.S. Appl. No. 15/900,164.
Notice of Allowance dated May 15, 2019 in U.S. Appl. No. 15/900,106.
Notice of Allowance dated May 15, 2019 in U.S. Appl. No. 15/900,242.
Notice of Allowance dated May 16, 2019 in U.S. Appl. No. 15/614,876.
Notice of Allowance dated May 16, 2019 in U.S. Appl. No. 15/621,464.
Notice of Allowance dated May 24, 2019 in U.S. Appl. No. 15/900,345.
Notice of Allowance dated May 24, 2019 in U.S. Appl. No. 16/143,646.
Notice of Allowance dated May 28, 2019 in U.S. Appl. No. 15/920,616.
Notice of Allowance dated May 29, 2019 in U.S. Appl. No. 15/900,160.
Notice of Allowance dated May 29, 2019 in U.S. Appl. No. 15/900,334.
Notice of Allowance dated May 30, 2019 in U.S. Appl. No. 15/900,230.
Office Action dated Apr. 19, 2018, which issued during the prosecution of U.S. Appl. No. 15/854,438.
Office Action dated Dec. 14, 2018, which issued during the prosecution of U.S. Appl. No. 15/920,517.
Office Action dated Dec. 17, 2018, which issued during the prosecution of U.S. Appl. No. 15/920,515.
Office Action dated Dec. 17, 2018, which issued during the prosecution of U.S. Appl. No. 15/920,533.
Office Action dated Dec. 17, 2018, which issued during the prosecution of U.S. Appl. No. 15/920,538.
Office Action dated Dec. 17, 2018, which issued during the prosecution of U.S. Appl. No. 15/920,544.
Office Action dated Dec. 20, 2018, which issued during the prosecution of U.S. Appl. No. 15/900,164.
Office Action dated Dec. 21, 2018, which issued during the prosecution of U.S. Appl. No. 15/900,230.
Office Action dated Feb. 25, 2016, which issued during the prosecution of U.S. Appl. No. 14/867,752.
Office Action dated Jan. 27, 2015 from the Japanese Patent Office in Japanese Application No. 2013-053543.

(56) References Cited

OTHER PUBLICATIONS

Office Action dated Jan. 31, 2018, which issued during the prosecution of U.S. Appl. No. 14/867,752.
Office Action dated Jul. 3, 2018, which issued during the prosecution of U.S. Appl. No. 15/920,518.
Office Action dated Jul. 6, 2015, which issued during the prosecution of U.S. Appl. No. 14/209,065.
Office Action dated Jul. 6, 2018 from the United States Patent and Trademark Office in U.S. Appl. No. 15/848,173.
Office Action dated Mar. 13, 2015, which issued during the prosecution of U.S. Appl. No. 14/209,065.
Office Action dated Mar. 16, 2017, which issued during the prosecution of U.S. Appl. No. 14/867,752.
Office Action dated Mar. 24, 2016, which issued during the prosecution of U.S. Appl. No. 14/209,065.
Office Action dated May 4, 2018 which issued during the prosecution of U.S. Appl. No. 15/422,821.
Office Action dated Nov. 28, 2018, which issued during the prosecution of U.S. Appl. No. 15/899,587.
Office Action dated Nov. 28, 2018, which issued during the prosecution of U.S. Appl. No. 15/900,080.
Office Action dated Nov. 28, 2018, which issued during the prosecution of U.S. Appl. No. 15/900,144.
Office Action dated Nov. 29, 2018, which issued during the prosecution of U.S. Appl. No. 15/380,309.
Office Action dated Nov. 29, 2018, which issued during the prosecution of U.S. Appl. No. 15/422,821.
Office Action dated Nov. 8, 2016 from the Japanese Patent Office in Japanese Application No. 2014-199022.
Office Action dated Oct. 15, 2018, which issued during the prosecution of U.S. Appl. No. 15/854,403.
Office Action dated Oct. 19, 2016, which issued during the prosecution of U.S. Appl. No. 14/867,752.
Office Action dated Oct. 3, 2018 from the United States Patent and Trademark Office in U.S. Appl. No. 15/280,195.
Office Action dated Sep. 10, 2015, which issued during the prosecution of U.S. Appl. No. 14/209,065.
Office Action dated Sep. 19, 2014, which issued during the prosecution of U.S. Appl. No. 14/209,065.
Office Action dated Sep. 26, 2017 issued by the Japanese Patent Office in JP Appln. No. 2014-265723.
Office Action dated Sep. 26, 2017 issued by the Japanese Patent Office in JP Appln. No. 2015-249264.
Office Action dated Sep. 28, 2018, which issued during the prosecution of U.S. Appl. No. 15/854,409.
Office Action dated Sep. 7, 2017, which issued during the prosecution of U.S. Appl. No. 14/867,752.
Office Action dated Apr. 15, 2019 in U.S. Appl. No. 16/182,083.
Office Action dated Apr. 16, 2019 in U.S. Appl. No. 16/232,165.
Office Action dated Apr. 23, 2019 in Japanese Application No. 2016-169851.
Office Action dated Apr. 23, 2019 in Japanese Application No. 2016-182230.
Office Action dated Aug. 23, 2019 in U.S. Appl. No. 15/854,409.
Office Action dated Aug. 25, 2017 in U.S. Appl. No. 14/838,663.
Office Action dated Aug. 27, 2019 in Japanese Application No. 2016-254428.
Office Action dated Aug. 27, 2019 in Japanese Application No. 2016-254430.
Office Action dated Aug. 27, 2019 in Japanese Application No. 2016-254432.
Office Action dated Aug. 28, 2019 in U.S. Appl. No. 15/854,397.
Office Action dated Aug. 6, 2019 in Japanese Application No. 2016-254421.
Office Action dated Aug. 6, 2019 in Japanese Application No. 2016-254427.
Office Action dated Dec. 19, 2018 in U.S. Appl. No. 15/900,345.
Office Action dated Dec. 19, 2018 in U.S. Appl. No. 15/900,379.
Office Action dated Dec. 20, 2018 in U.S. Appl. No. 15/900,106.
Office Action dated Dec. 20, 2018 in U.S. Appl. No. 15/900,242.
Office Action dated Dec. 21, 2018 in U.S. Appl. No. 15/900,160.
Office Action dated Dec. 21, 2018 in U.S. Appl. No. 15/920,616.
Office Action dated Dec. 25, 2018 in Japanese Application No. 2015-245144.
Office Action dated Dec. 25, 2018 in Japanese Application No. 2015-245145.
Office Action dated Dec. 25, 2018 in Japanese Application No. 2015-254192.
Office Action dated Dec. 27, 2018 in U.S. Appl. No. 15/900,334.
Office Action dated Dec. 31, 2018 in U.S. Appl. No. 16/009,603.
Office Action dated Dec. 7, 2018 in U.S. Appl. No. 15/920,592.
Office Action dated Feb. 11, 2016 in U.S. Appl. No. 14/838,663.
Office Action dated Feb. 21, 2019 in U.S. Appl. No. 15/854,383.
Office Action dated Feb. 26, 2019 in Japanese Application No. 2016-123207.
Office Action dated Feb. 26, 2019 in U.S. Appl. No. 15/380,336.
Office Action dated Feb. 26, 2019 in U.S. Appl. No. 15/624,792.
Office Action dated Feb. 26, 2019 in U.S. Appl. No. 15/624,897.
Office Action dated Feb. 26, 2019 in U.S. Appl. No. 15/626,832.
Office Action dated Feb. 28, 2019 in U.S. Appl. No. 15/920,518.
Office Action dated Feb. 5, 2019 in Japanese Application No. 2016-117339.
Office Action dated Feb. 5, 2019 in Japanese Application No. 2016-123205.
Office Action dated Feb. 5, 2019 in Japanese Application No. 2016-169871.
Office Action dated Feb. 5, 2019 in U.S. Appl. No. 16/038,339.
Office Action dated Feb. 7, 2019 in U.S. Appl. No. 15/621,464.
Office Action dated Jan. 10, 2019 in U.S. Appl. No. 15/899,430.
Office Action dated Jan. 29, 2019 in U.S. Appl. No. 15/614,876.
Office Action dated Jan. 30, 2019 in U.S. Appl. No. 15/620,916.
Office Action dated Jul. 16, 2019 in Japanese Application No. 2016-124933.
Office Action dated Jun. 10, 2019 in U.S. Appl. No. 15/920,518.
Office Action dated Jun. 25, 2019 in Japanese Application No. 2015-245144.
Office Action dated Jun. 6, 2019 in U.S. Appl. No. 15/899,587.
Office Action dated Mar. 15, 2018 in U.S. Appl. No. 14/838,663.
Office Action dated Mar. 15, 2019 in U.S. Appl. No. 15/280,195.
Office Action dated Mar. 15, 2019 in U.S. Appl. No. 15/619,012.
Office Action dated Mar. 15, 2019 in U.S. Appl. No. 15/627,696.
Office Action dated Mar. 15, 2019 in U.S. Appl. No. 15/690,906.
Office Action dated Mar. 18, 2019 in U.S. Appl. No. 15/442,961.
Office Action dated Mar. 19, 2019 in Japanese Application No. 2016-116261.
Office Action dated Mar. 19, 2019 in Japanese Application No. 2016-124515.
Office Action dated Mar. 19, 2019 in Japanese Application No. 2016-124529.
Office Action dated Mar. 19, 2019 in Japanese Application No. 2016-124932.
Office Action dated Mar. 19, 2019 in Japanese Application No. 2016-124933.
Office Action dated Mar. 19, 2019 in Japanese Application No. 2016-124935.
Office Action dated Mar. 19, 2019 in U.S. Appl. No. 15/443,094.
Office Action dated Mar. 21, 2019 in U.S. Appl. No. 15/900,144.
Office Action dated Mar. 21, 2019 in U.S. Appl. No. 16/160,377.
Office Action dated Mar. 27, 2019 in U.S. Appl. No. 15/690,400.
Office Action dated Mar. 30, 2017 in U.S. Appl. No. 14/838,663.
Office Action dated Mar. 5, 2019 in U.S. Appl. No. 15/443,026.
Office Action dated Mar. 5, 2019 in U.S. Appl. No. 15/854,397.
Office Action dated Mar. 6, 2019 in U.S. Appl. No. 15/854,403.
Office Action dated Mar. 7, 2019 in U.S. Appl. No. 15/854,439.
Office Action dated May 23, 2019 in U.S. Appl. No. 15/388,911.
Office Action dated Nov. 14, 2018 in U.S. Appl. No. 16/100,289.
Office Action dated Nov. 19, 2018 in U.S. Appl. No. 15/900,141.
Office Action dated Oct. 12, 2018 in U.S. Appl. No. 15/854,397.
Office Action dated Sep. 12, 2016 in U.S. Appl. No. 14/838,663.
Office Action dated Sep. 16, 2019 in U.S. Appl. No. 15/854,403.
Office Action dated Sep. 17, 2019 in Japanese Application No. 2017-029499.
Office Action dated Sep. 19, 2019 in U.S. Appl. No. 15/443,026.

(56) References Cited

OTHER PUBLICATIONS

Office Action dated Sep. 20, 2019 in U.S. Appl. No. 15/442,961.
Office Action dated Sep. 24, 2019 in Japanese Application No. 2016-254436.
Office Action dated Sep. 24, 2019 in Japanese Application No. 2016-254439.
Office Action dated Sep. 24, 2019 in Japanese Application No. 2016-254441.
Office Action dated Sep. 24, 2019 in Japanese Application No. 2016-254450.
Office Action dated Sep. 24, 2019 in Japanese Application No. 2017-029491.
Office Action dated Sep. 24, 2019 in Japanese Application No. 2017-029508.
Office Action dated Sep. 24, 2019 in Japanese Application No. 2017-065730.
Office Action dated Sep. 3, 2019 in Japanese Application No. 2016-254434.
Office Action dated Oct. 1, 2019 in Japanese Application No. 2017-029495.
Office Action dated Oct. 1, 2019 in Japanese Application No. 2017-029493.
Office Action dated Oct. 1, 2019 in Japanese Application No. 2017-029494.
Office Action dated Oct. 2, 2019 in U.S. Appl. No. 15/443,094.
Office Action dated Oct. 5, 2017 from the United States Patent and Trademark Office in U.S. Appl. No. 15/241,286.
Office Action dated Oct. 5, 2017 from the United States Patent and Trademark Office in U.S. Appl. No. 15/241,631.
Office Action dated Oct. 5, 2017 from the United States Patent and Trademark Office in U.S. Appl. No. 15/378,907.
Office Action dated Oct. 5, 2017 from the United States Patent and Trademark Office in U.S. Appl. No. 15/241,297.
Notice of Allowance dated Mar. 21, 2018 in U.S. Appl. No. 15/241,286.
Notice of Allowance dated Mar. 27, 2018 in U.S. Appl. No. 15/241,631.
Notice of Allowance dated Mar. 19, 2018 in U.S. Appl. No. 15/378,907.
Notice of Allowance dated Mar. 21, 2018 in U.S. Appl. No. 15/241,297.
Office Action dated Oct. 8, 2019 in Japanese Application No. 2017-029492.
Office Action dated Oct. 8, 2019 in Japanese Application No. 2017-065700.
Office Action dated Oct. 8, 2019 in Japanese Application No. 2017-065708.
Office Action dated Oct. 8, 2019 in Japanese Application No. 2017-065678.
Office Action dated Oct. 10, 2019 in U.S. Appl. No. 15/705,531.
Office Action dated Oct. 9, 2019 in U.S. Appl. No. 16/440,161.
Office Action dated Oct. 22, 2019 in U.S. Appl. No. 16/037,564.
Notice of Allowance dated Oct. 17, 2019 in U.S. Appl. No. 15/388,911.
Office Action dated Dec. 10, 2019 in Japanese Application No. 2016-254428.
Office Action dated Dec. 17, 2019 in Japanese Application No. 2016-254430.
Office Action dated Dec. 17, 2019 in Japanese Application No. 2016-254432.
Office Action dated Dec. 17, 2019 in Japanese Application No. 2017-029507.
Office Action dated Dec. 24, 2019 in Japanese Application No. 2016-254434.
Office Action dated Dec. 24, 2019 in Japanese Application No. 2017-029510.
Office Action dated Nov. 26, 2019 in Japanese Application No. 2016-254421.
Office Action dated Nov. 26, 2019 in Japanese Application No. 2017-029496.
Office Action dated Nov. 26, 2019 in Japanese Application No. 2017-029502.
Office Action dated Nov. 26, 2019 in Japanese Application No. 2017-065694.
Advisory Action dated Jan. 17, 2020 in U.S. Appl. No. 15/443,094.
Office Action dated Jan. 28, 2020 in U.S. Appl. No. 15/442,961.
Notice of Allowance dated Feb. 7, 2020 in U.S. Appl. No. 16/440,161.
Notice of Allowance dated Feb. 20, 2020 in U.S. Appl. No. 15/705,531.
Office Action dated Feb. 21, 2020 in U.S. Appl. No. 16/038,514.
Notice of Allowance dated Mar. 18, 2020 in U.S. Appl. No. 16/037,564.
Office Action dated Mar. 10, 2020 in U.S. Appl. No. 16/037,573.
Office Action dated Mar. 10, 2020 in U.S. Appl. No. 16/037,596.
Office Action dated Mar. 10, 2020 in U.S. Appl. No. 16/037,681.
Office Action dated Mar. 10, 2020 in U.S. Appl. No. 16/038,545.
Office Action dated Mar. 10, 2020 in U.S. Appl. No. 16/038,687.
Office Action dated Mar. 10, 2020 in U.S. Appl. No. 16/038,771.
Office Action dated Mar. 10, 2020 in U.S. Appl. No. 16/038,847.
Office Action dated Mar. 10, 2020 in U.S. Appl. No. 16/142,560.
Office Action dated Mar. 10, 2020 in U.S. Appl. No. 16/143,747.
Office Action dated Mar. 10, 2020 in U.S. Appl. No. 16/144,428.
Office Action dated Mar. 13, 2020 in U.S. Appl. No. 16/038,669.
Office Action dated Mar. 13, 2020 in U.S. Appl. No. 16/144,605.
Office Action dated Mar. 31, 2020 in U.S. Appl. No. 15/443,026.
Office Action dated Apr. 1, 2020 in U.S. Appl. No. 15/443,094.
Office Action dated Apr. 29, 2020 in U.S. Appl. No. 16/012,018.
Notice of Allowance dated May 7, 2020 in U.S. Appl. No. 16/038,514.
U.S. Appl. No. 15/052,115, Patented as U.S. Pat. No. 9,704,527.
U.S. Appl. No. 15/218,190, Patented as U.S. Pat. No. 9,721,606.
U.S. Appl. No. 15/280,195, Patented as U.S. Pat. No. 10,540,996.
U.S. Appl. No. 15/422,821, Patented as U.S. Pat. No. 10,475,481.
U.S. Appl. No. 15/422,944, Patented as U.S. Pat. No. 10,347,279.
U.S. Appl. No. 15/466,143, Patented as U.S. Pat. No. 9,837,116.
U.S. Appl. No. 15/619,012, Patented as U.S. Pat. No. 10,515,660.
U.S. Appl. No. 15/624,897, Patented as U.S. Pat. No. 10,510,368.
U.S. Appl. No. 15/624,792, Patented as U.S. Pat. No. 10,497,388.
U.S. Appl. No. 15/626,832, Patented as U.S. Pat. No. 10,510,370.
U.S. Appl. No. 15/625,428, Patented as U.S. Pat. No. 10,403,318.
U.S. Appl. No. 14/978,834, Patented as U.S. Pat. No. 9,721,605.
U.S. Appl. No. 14/757,555, Patented as U.S. Pat. No. 9,711,174.
U.S. Appl. No. 15/197,046, Patented as U.S. Pat. No. 9,721,607.
U.S. Appl. No. 15/380,336, Patented as U.S. Pat. No. 10,522,180.
U.S. Appl. No. 15/614,876, Patented as U.S. Pat. No. 10,431,248.
U.S. Appl. No. 15/620,916, Patented as U.S. Pat. No. 10,477,072.
U.S. Appl. No. 15/621,464, Patented as U.S. Pat. No. 10,431,249.
U.S. Appl. No. 15/626,720, Patented as U.S. Pat. No. 10,347,280.
U.S. Appl. No. 15/854,383, Patented as U.S. Pat. No. 10,438,628.
U.S. Appl. No. 15/854,507, Patented as U.S. Pat. No. 9,984,716.
U.S. Appl. No. 15/854,439, Patented as U.S. Pat. No. 10,482,915.
U.S. Appl. No. 15/854,506, Patented as U.S. Pat. No. 10,008,230.
U.S. Appl. No. 15/848,173, Patented as U.S. Pat. No. 10,403,320.
U.S. Appl. No. 15/628,814, Patented as U.S. Pat. No. 10,504,546.
U.S. Appl. No. 15/690,400, Patented as U.S. Pat. No. 10,529,368.
U.S. Appl. No. 15/690,906, Patented as U.S. Pat. No. 10,522,179.
U.S. Appl. No. 15/626,355, Patented as U.S. Pat. No. 10,510,369.
U.S. Appl. No. 15/627,696, Patented as U.S. Pat. No. 10,522,171.
U.S. Appl. No. 14/870,618, Patented as U.S. Pat. No. 9,959,894.
U.S. Appl. No. 15/388,911, Patented as U.S. Pat. No. 10,573,341.
U.S. Appl. No. 14/753,227, Patented as U.S. Pat. No. 9,601,146.
U.S. Appl. No. 15/380,309, Patented as U.S. Pat. No. 10,403,319.
U.S. Appl. No. 15/388,864, Patented as U.S. Pat. No. 9,773,519.
U.S. Appl. No. 15/072,550, Patented as U.S. Pat. No. 9,704,525.
U.S. Appl. No. 15/615,871, Patented as U.S. Pat. No. 10,074,393.
U.S. Appl. No. 15/854,410, Patented as U.S. Pat. No. 9,972,351.
U.S. Appl. No. 15/378,907, Patented as U.S. Pat. No. 9,984,710.
U.S. Appl. No. 15/241,631, Patented as U.S. Pat. No. 10,026,435.
U.S. Appl. No. 14/209,065, Patented as U.S. Pat. No. 9,530,444.
U.S. Appl. No. 15/854,474, Patented as U.S. Pat. No. 9,978,414.
U.S. Appl. No. 15/854,403, Abandoned.
U.S. Appl. No. 15/241,297, Patented as U.S. Pat. No. 10,026,434.
U.S. Appl. No. 15/241,286, Patented as U.S. Pat. No. 10,026,4331.
U.S. Appl. No. 15/464,991, Patented as U.S. Pat. No. 9,779,772.

(56) References Cited

OTHER PUBLICATIONS

U.S. Appl. No. 14/867,752, Patented as U.S. Pat. No. 10,026,430.
U.S. Appl. No. 15/854,438, Patented as U.S. Pat. No. 10,373,633.
U.S. Appl. No. 15/854,409, Abandoned.
U.S. Appl. No. 15/443,026, Pending.
U.S. Appl. No. 15/920,782, Patented as U.S. Pat. No. 10,134,433.
U.S. Appl. No. 15/920,563, Patented as U.S. Pat. No. 10,360,937.
U.S. Appl. No. 15/920,533, Patented as U.S. Pat. No. 10,431,251.
U.S. Appl. No. 15/900,144, Patented as U.S. Pat. No. 10,497,384.
U.S. Appl. No. 15/900,080, Patented as U.S. Pat. No. 10,460,756.
U.S. Appl. No. 15/900,230, Patented as U.S. Pat. No. 10,431,250.
U.S. Appl. No. 15/900,164, Patented as U.S. Pat. No. 10,424,330.
U.S. Appl. No. 15/920,518, Patented as U.S. Pat. No. 10,546,605.
U.S. Appl. No. 15/899,587, Patented as U.S. Pat. No. 10,546,602.
U.S. Appl. No. 15/899,430, Patented as U.S. Pat. No. 10,403,314.
U.S. Appl. No. 15/920,515, Patented as U.S. Pat. No. 10,410,665.
U.S. Appl. No. 15/920,517, Patented as U.S. Pat. No. 10,395,685.
U.S. Appl. No. 15/920,538, Patented as U.S. Pat. No. 10,403,317.
U.S. Appl. No. 15/920,544 Patented as U.S. Pat. No. 10,410,666.
U.S. Appl. No. 15/920,768, Patented as U.S. Pat. No. 10,373,639.
U.S. Appl. No. 16/009,603, Patented as U.S. Pat. No. 10,366,721.
U.S. Appl. No. 16/182,083, Patented as U.S. Pat. No. 10,515,661.
U.S. Appl. No. 15/705,531, Allowed.
U.S. Appl. No. 16/232,165, Patented as U.S. Pat. No. 10,510,366.
U.S. Appl. No. 16/100,289, Patented as U.S. Pat. No. 10,497,389.
U.S. Appl. No. 16/038,669, Pending.
U.S. Appl. No. 15/900,106, Patented as U.S. Pat. No. 10,438,624.
U.S. Appl. No. 15/900,412, Patented as U.S. Pat. No. 10,062,4032.
U.S. Appl. No. 15/900,141, Patented as U.S. Pat. No. 10,573,338.
U.S. Appl. No. 15/900,160, Patented as U.S. Pat. No. 10,438,625.
U.S. Appl. No. 15/900,345, Patented as U.S. Pat. No. 10,482,913.
U.S. Appl. No. 15/900,379, Patented as U.S. Pat. No. 10,453,488.
U.S. Appl. No. 16/012,018, Pending.
U.S. Appl. No. 15/900,616, Patented as U.S. Pat. No. 10,438,623.
U.S. Appl. No. 15/900,242, Patented as U.S. Pat. No. 10,475,480.
U.S. Appl. No. 15/900,334, Patented as U.S. Pat. No. 10,438,621.
U.S. Appl. No. 15/920,592, Patented as U.S. Pat. No. 10,403,312.
U.S. Appl. No. 15/920,635, Patented as U.S. Pat. No. 10,170,144.
U.S. Appl. No. 16/160,377, Patented as U.S. Pat. No. 10,490,220.
U.S. Appl. No. 15/443,094, Pending.
U.S. Appl. No. 15/442,961, Pending.
U.S. Appl. No. 16/038,687, Pending.
U.S. Appl. No. 16/038,514, Allowed.
U.S. Appl. No. 16/038,545, Pending.
U.S. Appl. No. 16/037,596, Pending.
U.S. Appl. No. 16/038,771, Pending.
U.S. Appl. No. 16/037,564, Allowed.
U.S. Appl. No. 16/038,339, Patented as U.S. Pat. No. 10,403,316.
U.S. Appl. No. 16/037,573, Pending.
U.S. Appl. No. 16/037,681, Pending.
U.S. Appl. No. 16/038,884 (the present Application), Pending.
U.S. Appl. No. 16/038,847, Pending.
U.S. Appl. No. 16/044,574, Patented as U.S. Pat. No. 10,438,622.
U.S. Appl. No. 16/142,560, Pending.
U.S. Appl. No. 16/184,312, Patented as U.S. Pat. No. 10,497,386.
U.S. Appl. No. 16/143,646, Patented as U.S. Pat. No. 10,515,657.
U.S. Appl. No. 16/144,428, Pending.
U.S. Appl. No. 16/143,747, Pending.
U.S. Appl. No. 16/440,161, Allowed.
U.S. Appl. No. 16/144,605, Pending.
U.S. Appl. No. 15/854,397, Abandoned.
U.S. Appl. No. 15/854,329, Patented as U.S. Pat. No. 9,984,712.
U.S. Appl. No. 14/838,663, Abandoned.
Notice of Allowance dated Aug. 17, 2020 in U.S. Appl. No. 15/443,026.
Notice of Allowance dated Aug. 3, 2020 in U.S. Appl. No. 16/038,847.
Notice of Allowance dated Jul. 23, 2020 in U.S. Appl. No. 16/037,573.
Notice of Allowance dated Jul. 23, 2020 in U.S. Appl. No. 16/038,669.
Notice of Allowance dated Jul. 24, 2020 in U.S. Appl. No. 16/037,596.
Notice of Allowance dated Jul. 27, 2020 in U.S. Appl. No. 16/038,771.
Notice of Allowance dated Jul. 29, 2020 in U.S. Appl. No. 16/142,560.
Notice of Allowance dated Jul. 29, 2020 in U.S. Appl. No. 16/144,428.
Notice of Allowance dated Jul. 29, 2020 in U.S. Appl. No. 16/144,605.
Notice of Allowance dated Jul. 30, 2020 in U.S. Appl. No. 16/038,545.
Notice of Allowance dated Jul. 30, 2020 in U.S. Appl. No. 16/038,687.
Notice of Allowance dated Sep. 17, 2020 in U.S. Appl. No. 16/012,018.
Notice of Allowance dated Sep. 23, 2020 in U.S. Appl. No. 15/443,094.
Office Action dated Jul. 8, 2020 in U.S. Appl. No. 15/442,961.
Notice of Allowance dated Jul. 29, 2020 in U.S. Appl. No. 16/037,681.

* cited by examiner

MAGNETIC TAPE HAVING CHARACTERIZED MAGNETIC LAYER

CROSS-REFERENCE TO RELATED APPLICATIONS

This application claims priority under 35 U.S.C. 119 to Japanese Patent Application No. 2017-140019 filed on Jul. 19, 2017 and Japanese Patent Application No. 2018-131331 filed on Jul. 11, 2018. Each of the above applications is hereby expressly incorporated by reference, in its entirety, into the present application.

BACKGROUND OF THE INVENTION

1. Field of the Invention

The present invention relates to a magnetic tape.

2. Description of the Related Art

Magnetic recording media are divided into tape-shaped magnetic recording media and disk-shaped magnetic recording media, and tape-shaped magnetic recording media, that is, magnetic tapes are mainly used for storage such as data back-up.

As the magnetic tapes, JP1989-60819A (JP-H01-60819A) discloses a magnetic tape including a back coating layer (described as a "back layer" in JP1989-60819A (JP-H01-60819A)) on a surface side of a non-magnetic support opposite to a surface side provided with a magnetic layer.

SUMMARY OF THE INVENTION

In addition, in recent years, it is necessary that surface smoothness of a magnetic layer is increased in a magnetic tape. This is because an increase in surface smoothness of a magnetic layer causes improvement of electromagnetic conversion characteristics.

However, the inventors have made studies regarding a magnetic tape including a back coating layer and found that, particularly, in a magnetic tape in which surface smoothness of a magnetic layer is increased so that a center line average surface roughness Ra measured regarding a surface of the magnetic layer is equal to or smaller than 1.8 nm, a phenomenon in which an edge part of the magnetic tape is damaged (hereinafter, referred to as "edge damage") significantly occurs, after causing the magnetic tape to run in a drive. In regards to this point, more specifically, the recording of information on the magnetic tape and/or reproducing the recorded information is performed by setting a magnetic tape cartridge in a drive, causing the magnetic tape to run in the drive, and causing the magnetic head mounted on the drive to come into contact with the surface of the magnetic layer for sliding. Since the magnetic tape is accommodated in the magnetic tape cartridge in a state of being wound around the reel, sending of the magnetic tape from the reel and winding thereof are performed during the running of the magnetic tape in the drive. In a case where disordered winding occurs at the time of this winding, an edge of the magnetic tape hits against a flange or the like of a reel and the edge damage may occur. This edge damage may cause an increase in the number of errors at the time of recording and/or a deterioration of running stability. Accordingly, it is necessary that the disordered winding is prevented to reduce the edge damage.

Therefore, an aspect of the invention provides for a magnetic tape in which a center line average surface roughness Ra measured regarding a surface of the magnetic layer is equal to or smaller than 1.8 nm and occurrence of edge damage is prevented.

According to one aspect of the invention, there is provided a magnetic tape comprising: a non-magnetic support; a magnetic layer including ferromagnetic powder, non-magnetic powder, and a binding agent on one surface side of the non-magnetic support; and a back coating layer including non-magnetic powder and a binding agent on the other surface side of the non-magnetic support, in which the ferromagnetic powder is ferromagnetic hexagonal ferrite powder, a center line average surface roughness Ra measured regarding a surface of the magnetic layer (hereinafter, also referred to as a "magnetic layer surface roughness Ra") is equal to or smaller than 1.8 nm, an intensity ratio (Int(110)/Int(114); hereinafter, also referred to as "X-ray diffraction (XRD) intensity ratio) of a peak intensity Int(110) of a diffraction peak of a (110) plane with respect to a peak intensity Int(114) of a diffraction peak of a (114) plane of a hexagonal ferrite crystal structure obtained by an X-ray diffraction analysis of the magnetic layer by using an In-Plane method is 0.5 to 4.0, a vertical squareness ratio of the magnetic tape is 0.65 to 1.00, and a logarithmic decrement acquired by a pendulum viscoelasticity test performed regarding a surface of the back coating layer (hereinafter, also referred to as a "logarithmic decrement of the back coating layer surface" or a "logarithmic decrement") is equal to or smaller than 0.060.

In one aspect, the logarithmic decrement may be 0.010 to 0.060.

In one aspect, the center line average surface roughness Ra measured regarding the surface of the magnetic layer may be 1.2 nm to 1.8 nm.

In one aspect, the vertical squareness ratio of the magnetic tape may be 0.65 to 0.90.

In one aspect, the magnetic tape may further comprise a non-magnetic layer including non-magnetic powder and a binding agent between the non-magnetic support and the magnetic layer.

According to one aspect of the invention, it is possible to provide a magnetic tape which has high surface smoothness of a magnetic layer and in which occurrence of edge damage is prevented.

DESCRIPTION OF THE PREFERRED EMBODIMENTS

Figure 1:
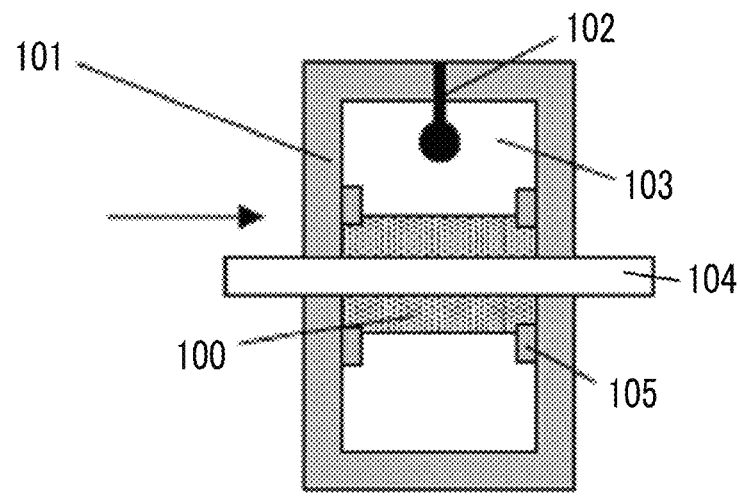
FIG. 1 is an explanatory diagram of a measurement method of a logarithmic decrement.

One aspect of the invention relates to a magnetic tape including: a non-magnetic support; a magnetic layer including ferromagnetic powder, non-magnetic powder, and a binding agent on one surface side of the non-magnetic support; and a back coating layer including non-magnetic powder and a binding agent on the other surface side of the non-magnetic support, in which the ferromagnetic powder is ferromagnetic hexagonal ferrite powder, a center line average surface roughness Ra measured regarding a surface of the magnetic layer is equal to or smaller than 1.8 nm, an intensity ratio (Int(110)/Int(114)) of a peak intensity Int(110) of a diffraction peak of a (110) plane with respect to a peak intensity Int(114) of a diffraction peak of a (114) plane of a hexagonal ferrite crystal structure obtained by an X-ray diffraction analysis of the magnetic layer by using an In-Plane method is 0.5 to 4.0, a vertical squareness ratio of the magnetic tape is 0.65 to 1.00, and a logarithmic decrement acquired by a pendulum viscoelasticity test performed regarding a surface of the back coating layer is equal to or smaller than 0.060.

Hereinafter, the magnetic tape will be described more specifically. The following description includes a surmise of the inventors. The invention is not limited to such a surmise. In addition, hereinafter, exemplary description may be made with reference to the drawings. However, the invention is not limited to the exemplified aspects.

In the magnetic tape, even in a case where the magnetic layer surface roughness Ra is equal to or smaller than 1.8 nm, occurrence of edge damage can be prevented. In regards to this point, the inventors have considered as follows.

The inventors have considered that a reason for which the edge damage significantly occurs in a magnetic tape having the magnetic layer surface roughness Ra equal to or smaller than 1.8 nm, is because an unstable contact state between the surface of the magnetic layer and the surface of the back coating layer, in a case of the winding, due to an increase in surface smoothness of the magnetic layer. With respect to this, the inventors have considered that, in the magnetic tape, the XRD intensity ratio, the vertical squareness ratio, and the logarithmic decrement measured regarding the surface of the back coating layer set to be in the respective ranges described above contribute to an increase in stability of the contact state between the surface of the magnetic layer and the surfaces of the back coating layer, thereby preventing occurrence of the edge damage occurred due to the disordered winding. This point will be described later in detail.

In the invention and the specification, the "surface of the magnetic layer" of the magnetic tape is identical to the surface of the magnetic tape on the magnetic layer side. The "surface of the back coating layer" is identical to the surface of the magnetic tape on the back coating layer side. In the invention and the specification, the "ferromagnetic hexagonal ferrite powder" means an aggregate of a plurality of ferromagnetic hexagonal ferrite particles. The ferromagnetic hexagonal ferrite particles are ferromagnetic particles having a hexagonal ferrite crystal structure. Hereinafter, particles (ferromagnetic hexagonal ferrite particles) configuring the ferromagnetic hexagonal ferrite powder are also referred to as simply "particles". The "aggregate" not only includes an aspect in which particles configuring the aggregate are directly in contact with each other, but also includes an aspect in which a binding agent, an additive, or the like is sandwiched between the particles. The points described above are also applied to various powders such as non-magnetic powder of the invention and the specification, in the same manner.

In the invention and the specification, the description regarding directions and angles (for example, vertical, orthogonal, parallel, and the like) includes a range of errors allowed in the technical field of the invention, unless otherwise noted. For example, the range of errors means a range of less than ±10' from an exact angle, and is preferably within ±5° and more preferably within ±3° from an exact angle.

Magnetic Layer Surface Roughness Ra

The magnetic layer surface roughness Ra measured regarding the surface of the magnetic layer of the magnetic tape (magnetic layer surface roughness Ra) is equal to or smaller than 1.8 nm. It is preferable that the magnetic layer surface roughness Ra is equal to or smaller than 1.8 nm, from a viewpoint of improving electromagnetic conversion characteristics. However, as described above, the edge damage significantly occurs in the magnetic tape having increased surface smoothness of the magnetic layer so that the magnetic layer roughness Ra becomes equal to or smaller than 1.8 nm. With respect to this, in the magnetic tape, by setting the XRD intensity ratio, the vertical squareness ratio, and the logarithmic decrement measured regarding the surface of the back coating layer to be in the respective ranges described above, occurrence of the edge damage can be prevented. From a viewpoint of further improving electromagnetic conversion characteristics, low magnetic layer surface roughness Ra is preferable. From this viewpoint, the magnetic layer surface roughness Ra can be equal to or smaller than 1.7 nm or equal to or smaller than 1.6 nm. In addition, the magnetic layer surface roughness Ra can be, for example, equal to or greater than 1.2 nm or equal to or greater than 1.3 nm. However, low magnetic layer surface roughness Ra is preferable, from a viewpoint of improving electromagnetic conversion characteristics, and thus, the magnetic layer surface roughness Ra may be lower than the value exemplified above, The center line average surface roughness Ra measured regarding the surface of the magnetic layer of the magnetic tape in the invention and the specification is a value measured with an atomic force microscope (AFM) in a region having an area of 40 μm×40 μm of the surface of the magnetic layer. As an example of the measurement conditions, the following measurement conditions can be used. The magnetic layer surface roughness Ra shown in examples which will be described later is a value obtained by the measurement under the following measurement conditions.

The measurement is performed regarding the region of 40 μm×40 μm of the area of the surface of the magnetic layer of the magnetic tape with an AFM (Nanoscope 4 manufactured by Veeco Instruments, Inc.) in a tapping mode. RTESP-300 manufactured by BRUKER is used as a probe, a scan speed (probe movement speed) is set as 40 μm/sec, and a resolution is set as 512 pixel×512 pixel.

The magnetic layer surface roughness Ra can be controlled by a well-known method. For example, the magnetic layer surface roughness Ra can be changed in accordance with the size of various powders included in the magnetic layer (for example, ferromagnetic hexagonal ferrite powder, non-magnetic powder, and the like) or manufacturing conditions of the magnetic tape. Thus, by adjusting these, it is possible to obtain the magnetic tape having the magnetic layer surface roughness Ra equal to or smaller than 1.8 am.

XRD Intensity Ratio and Vertical Squareness Ratio

Next, the XRD intensity ratio and the vertical squareness ratio will be described.

The magnetic tape of the magnetic tape device includes ferromagnetic hexagonal ferrite powder and non-magnetic powder in the magnetic layer. The non-magnetic powder in the magnetic layer can preferably function as an abrasive or a projection formation agent, as will be described later in detail. However, it is thought that, in a case where the particles of non-magnetic powder (non-magnetic particles) present in the surface of the magnetic layer and/or the vicinity of the surface of the magnetic layer do not suitably sink into the magnetic layer with a force received from the magnetic head, at the time of the sliding of the surface of the magnetic layer and the magnetic head, chipping of the magnetic head (head chipping) may occur due to the contact with the particles of the non-magnetic powder. On the other hand, it is thought that, in a case where the particles of the non-magnetic powder excessively sink into the magnetic layer, at the time of the sliding of the surface of the magnetic layer and the magnetic head, the area of the contact between the surface of the magnetic layer and the magnetic head (real contact) increases, a force applied to the surface of the magnetic layer from the magnetic head at the time of the sliding becomes strong, and the surface of the magnetic layer is damaged, thereby causing the chipping of the surface of the magnetic layer.

The inventors have surmised that scraps generated due to the head chipping and scraps generated due to the chipping of the surface of the magnetic layer described above are interposed between the surface of the magnetic layer and the surface of the back coating layer, thereby decreasing stability of a contact state between the surface of the magnetic layer and the surface of the back coating layer at the time of winding.

In regards to this point, the inventors have surmised that, particles which supports the particles of the non-magnetic powder put into the magnetic layer and affects a degree of the sinking (hereinafter, also referred to as "former particles") and particles which are considered not to affect or slightly affects the sinking (hereinafter, also referred to as "latter particles") are included in the particles configuring the ferromagnetic hexagonal ferrite powder included in the magnetic layer. It is considered that the latter particles are, for example, fine particles generated due to partial chipping of particles due to a dispersion process performed at the time of preparing a magnetic layer forming composition.

The inventors have thought that, in the particles configuring the ferromagnetic hexagonal ferrite powder (ferromagnetic hexagonal ferrite particles) included in the magnetic layer, the former particles are particles causing the diffraction peak in the X-ray diffraction analysis using the In-Plane method, and since the latter particles are fine, the latter particles do not or hardly affect the diffraction peak. Accordingly, it is surmised that it is possible to control a presence state of the ferromagnetic hexagonal ferrite particles which supports the particles of the non-magnetic powder put into the magnetic layer and affects a degree of the sinking, in the magnetic layer, based on the intensity of the diffraction peak caused by the X-ray diffraction analysis of the magnetic layer using the In-Plane method, and as a result, it is possible to control a degree of the sinking of the particles of the non-magnetic powder. Specifically, the inventors have surmised that, as the value of the XRD intensity ratio is small, the particles of the non-magnetic powder easily sink, and as the value thereof is great, the particles thereof hardly sink. The inventors have thought that, the sinking of the particles of the non-magnetic powder can be suitably controlled to a degree that, the head chipping and the chipping of the surface of the magnetic layer can be prevented, by setting the XRD intensity ratio to be 0.5 to 4.0. The inventors have surmised that, this causes preventing a decrease in stability of the contact state between the surface of the magnetic layer and the surface of the back coating layer at the time of the winding, due to the scraps generated due to the head chipping and the scraps generated due to the surface of the magnetic layer which are interposed between the surface of the magnetic layer and the surface of the back coating layer.

Meanwhile, the vertical squareness ratio is a ratio of residual magnetization with respect to saturation magnetization measured in a direction vertical to the surface of the magnetic layer and this value decreases, as a value of the residual magnetization decreases. It is surmised that, since the latter particles are fine and hardly hold magnetization, as a large amount of the latter particles is included in the magnetic layer, the vertical squareness ratio tends to decrease. Accordingly, the inventors have thought that the vertical squareness ratio may be an index for the amount of the latter particles (fine particles) present in the magnetic layer. In addition, the inventors have surmised that, as a large amount of the fine particles is included in the magnetic layer, hardness of the magnetic layer is decreased, the chipping of the surface of the magnetic layer easily occurs due to the contact with the magnetic head and the like, the scraps generated due to the chipping are interposed between the surface of the magnetic layer and the surface of the back coating layer, and accordingly, stability of the contact state between the surface of the magnetic layer and the surface of the back coating layer at the time of the winding decreases. With respect to this, the inventors have thought that, in the magnetic layer having the vertical squareness ratio of 0.65 to 1.00, the chipping of the surface of the magnetic layer which is hardly performed due to the decreased presence amount of the latter particles (fine particles) contributes to an increase in stability of the contact state between the surface of the magnetic layer and the surface of the back coating layer at the time of the winding.

As described above, the invention have surmised that the XRD intensity ratio of 0.5 to 4.0 and the vertical squareness ratio of 0.65 to 1,00 causes an increase in stability of the contact state between the surface of the magnetic layer and the surface of the back coating layer at the time of the winding, thereby contributing to the prevention of occurrence of the edge damage.

However, this is merely a surmise and the invention is not limited, thereto.

XRD Intensity Ratio

The XRD intensity ratio is obtained by the X-ray diffraction analysis of the magnetic layer including the ferromagnetic hexagonal ferrite powder by using the In-Plane method. Hereinafter, the X-ray diffraction analysis performed by using the In-Plane method is also referred to as "In-Plane XRD". The In-Plane XRD is performed by irradiating the surface of the magnetic layer with the X-ray by using a thin film X-ray diffraction device under the following conditions. A measurement direction is a longitudinal direction of the magnetic tape.

Cu ray source used (output of 45 kV, 200 mA)

Scan conditions: 0.05 degree/step, 0.1 degree/min in a range of 20 to 40 degrees Optical system used: parallel optical system Measurement method: $2\theta_\chi$ scan (X-ray incidence angle of)$0.25°$)

The values of the conditions are set values of the thin film X-ray diffraction device. As the thin film X-ray diffraction device, a well-known device can be used. As an example of the thin film X-ray diffraction device, Smart Lab manufactured by Rigaku Corporation. A sample to be subjected to the In-Plane XRD analysis is a tape sample cut out from the magnetic tape which is a measurement target, and the size and the shape thereof are not limited, as long as the diffraction peak which will be described later can be confirmed.

As a method of the X-ray diffraction analysis, thin film X-ray diffraction and powder X-ray diffraction are used. In the powder X-ray diffraction, the X-ray diffraction of the powder sample is measured, whereas, according to the thin film X-ray diffraction, the X-ray diffraction of a layer or the like formed on a substrate can be measured. The thin film X-ray diffraction is classified into the In-Plane method and an Out-Of-Plane method. The X-ray incidence angle at the time of the measurement is 5.00° to 90.00° in a case of the Out-Of-Plane method, and is generally 0.20° to 0.50', in a case of the In-Plane method. In the In-Plane XRD of the invention and the specification, the X-ray incidence angle is 0.25° as described above. In the In-Plane method, the X-ray incidence angle is smaller than that in the Out-Of-Plane method, and thus, a depth of penetration of the X-ray is shallow. Accordingly, according to the X-ray diffraction analysis by using the In-Plane method (In-Plane XRD), it is possible to perform the X-ray diffraction analysis of a surface portion of a measurement target sample. Regarding the tape sample, according to the In-Plane XRD, it is possible to perform the X-ray diffraction analysis of the magnetic layer. The XRD intensity ratio is an intensity ratio (Int(110)/Int(114)) of a peak intensity Int(110) of a diffraction peak of a (110) plane with respect to a peak intensity Int(114) of a diffraction peak of a (114) plane of a hexagonal ferrite crystal structure, in X-ray diffraction spectra obtained by the In-Plane XRD. The term int is used as abbreviation of intensity. In the X-ray diffraction spectra obtained by In-Plane XRD (vertical axis: intensity, horizontal axis: diffraction angle $2\theta_\chi$ (degree)), the diffraction peak of the (114) plane is a peak at which the $2\theta_\chi$ is detected at 33 to 36 degrees, and the diffraction peak of the (110) plane is a peak at which the $2\theta_\chi$ is detected at 29 to 32 degrees.

Among the diffraction plane, the (114) plane having a hexagonal ferrite crystal structure is positioned close to particles of the ferromagnetic hexagonal ferrite powder (ferromagnetic hexagonal ferrite particles) in an easy-magnetization axial direction (c axis direction). In addition the (110) plane having a hexagonal ferrite crystal structure is positioned in a direction orthogonal to the easy-magnetization axial direction.

The inventors have surmised that, in the X-ray diffraction spectra obtained by the In-Plane XRD, as the intensity ratio (Int(110)/Int(114); XRD intensity ratio) of the peak intensity Int(110) of the diffraction peak of a (110) plane with respect to the peak intensity Int(114) of the diffraction peak of the (114) plane of a hexagonal ferrite crystal structure increases, a large number of the former particles present in a state where a direction orthogonal to the easy-magnetization axial direction is closer to a parallel state with respect to the surface of the magnetic layer is present in the magnetic layer, and as the XRD intensity ratio decreases, a small amount of the former particles present in such a state is present in the magnetic layer. It is thought that a state where the XRD intensity ratio is 0.5 to 4.0 means a state where the former particles are suitably aligned in the magnetic layer. It is surmised that this causes an increase in stability of the contact state between the surface of the magnetic layer and the surface of the back coating layer at the time of the winding, thereby contributing to the prevention of occurrence of the edge damage. Details of the surmise are as described above.

The XRD intensity ratio is preferably equal to or smaller than 3.5 and more preferably equal to or smaller than 3.0, from a viewpoint of further preventing occurrence of the edge damage. From the same viewpoint, the XRD intensity ratio is preferably equal to or greater than 0.7 and more preferably equal to or greater than 1.0. The XRD intensity ratio can be, for example, controlled in accordance with process conditions of an alignment process performed in a manufacturing step of the magnetic tape. As the alignment process, the homeotropic alignment process is preferably performed. The homeotropic alignment process can be preferably performed by applying a magnetic field vertically to the surface of a coating layer of a magnetic layer forming composition in a wet state (undried state). As the alignment conditions are reinforced, the value of the XRD intensity ratio tends to increase. As the process conditions of the alignment process, magnetic field strength of the alignment process is used. The process conditions of the alignment process are not particularly limited. The process conditions of the alignment process may be set so as that the XRD intensity ratio of 0.5 to 4.0 can be realized. As an example, the magnetic field strength of the homeotropic alignment process can be 0.10 to 0.80 T or 0.10 to 0.60 T. As dispersibility of the ferromagnetic hexagonal ferrite powder in the magnetic layer forming composition increases, the value of the XRD intensity ratio tends to increase by the homeotropic alignment process.

Vertical Squareness Ratio

The vertical squareness ratio is a squareness ratio measured regarding a magnetic tape in a vertical direction. The "vertical direction" described regarding the squareness ratio is a direction orthogonal to the surface of the magnetic layer. That is, regarding the magnetic tape, the vertical direction is a direction orthogonal to a longitudinal direction of the magnetic tape. The vertical squareness ratio is measured by using an oscillation sample type magnetic-flux meter. Specifically, the vertical squareness ratio of the invention and the specification is a value obtained by sweeping an external magnetic field in the magnetic tape at a measurement temperature of 23° C.±1° C. in the oscillation sample type magnetic-flux meter, under conditions of a maximum external magnetic field of 1194 kA/m (15 kOe) and a scan speed of 4.8 kA/m/sec (60 Oe/sec), and is a value after diamagnetic field correction. The measurement value is obtained as a value obtained by subtracting magnetization of a sample probe of the oscillation sample type magnetic-flux meter as background noise.

The vertical squareness ratio of the magnetic tape is equal to or greater than 0.65. The inventors have surmised that the vertical squareness ratio of the magnetic tape is an index for the presence amount of the latter particles (fine particles) described above. It is thought that, in the magnetic layer in which the vertical squareness ratio of the magnetic tape is equal to or greater than 0.65, the presence amount of such fine particles is small. As described above in detail, the inventors have surmised that this also contributes to prevention of the occurrence of the edge damage.

From a viewpoint of further preventing the occurrence of the edge damage, the vertical squareness ratio is preferably equal to or greater than 0.68, more preferably equal to or greater than 0.70, even more preferably equal to or greater than 0.73, and still more preferably equal to or greater than 0.75. In addition, in principle, a maximum value of the squareness ratio is 1.00. Accordingly, the vertical squareness ratio of the magnetic tape is equal to or smaller than 1.00. The vertical squareness ratio may be, for example, equal to or smaller than 0.95, equal to or smaller than 0.90, equal to or smaller than 0.87, or equal to or smaller than 0.85. It is thought that, a great value of the vertical squareness ratio is preferable, from a viewpoint of decreasing the amount of the fine latter particles in the magnetic layer and further preventing the occurrence of the edge damage. Therefore, the vertical squareness ratio may be greater than the value exemplified above.

The inventors have considered that, in order to set the vertical squareness ratio to be equal to or greater than 0.65, it is preferable to prevent occurrence of fine particles due to partial chipping of the particles in a preparation step of the magnetic layer forming composition. A specific method for preventing the occurrence of chipping will be described later.

Logarithmic Decrement of Back Coating Layer Surface

In regards to the prevention of the occurrence of the edge damage, the inventors have thought that, an increase in uniformity of adhesiveness between the surface of the magnetic layer and the surface of the back coating layer in each portion on the surface at the time of the winding, also contributes to an increase in stability of the contact state between the surface of the magnetic layer and the surface of the back coating layer at the time of the winding. It is surmised that pressure sensitive adhesive components separated from the surface of the back coating layer affect the adhesiveness. Specifically, it is surmised that uniformity the adhesiveness between the surface of the magnetic layer and the surface of the back coating layer in each portion on the surface at the time of the winding decreases, as the amount of the pressure sensitive adhesive components increases, and the uniformity of the adhesiveness increases, as the amount of the pressure sensitive adhesive components decreases.

In regards to this point described above, the inventors have considered that the logarithmic decrement measured by a method which will be described later is a value which may be an index of the amount of the pressure sensitive adhesive components separated from the surface of the back coating layer. Specifically, it is thought that, the value of the logarithmic decrement increases, as the amount of the pressure sensitive adhesive components increases, and the value of the logarithmic decrement decreases, as the amount of the pressure sensitive adhesive components decreases. The inventors have considered that, in the magnetic tape, by setting the logarithmic decrement measured regarding the surface of the hack coating layer to be equal to or smaller than 0.060, the uniformity of the adhesiveness between the surface of the back coating layer and the surface of the magnetic layer in each portion on the surface at the time of the winding can be increased.

The details of the pressure sensitive adhesive components are not clear. The inventors have surmised that the pressure sensitive adhesive components may be derived from a resin used as a binding agent. The specific description is as follows.

As a binding agent, various resins can be used as will be described later in detail. The resin is a polymer (including a homopolymer or a copolymer) of two or more polymerizable compounds and generally also includes a component having a molecular weight which is smaller than an average molecular weight (hereinafter, referred to as a "binding agent component having a low molecular weight"). The inventors have considered that, as a large amount of the binding agent component having a low molecular weight is separated from the surface of the back coating layer, the uniformity of the adhesiveness between the surface of the magnetic layer and the surface of the back coating layer in each portion on the surface at the time of the winding decreases. The inventors have surmised that the binding agent component having a low molecular weight have pressure sensitive adhesive properties and the logarithmic decrement acquired by the method described above may be an index for the amount of the pressure sensitive adhesive components separated from the surface of the back coating layer hit one aspect, the back coating layer is formed by applying a back coating layer forming composition including a curing agent in addition to non-magnetic powder and a binding agent onto a surface of a non-magnetic support and performing a curing process. With the curing process here, it is possible to allow a curing reaction (crosslinking reaction) between the binding agent and the curing agent. However, the inventors have considered that the binding agent component having a low molecular weight may have poor reactivity regarding the curing reaction. The reason thereof is not clear. The inventors have surmised that, since the reactivity regarding the curing reaction is poor, the binding agent component having a low molecular weight which hardly remains in the back coating layer may be one of reasons for that the binding agent component having a low molecular weight is separated from the surface of the back coating layer.

In the invention and the specification, the logarithmic decrement acquired by a pendulum viscoelasticity test performed regarding the surface of the back coating layer is a value obtained by the following method.

Figure 2:
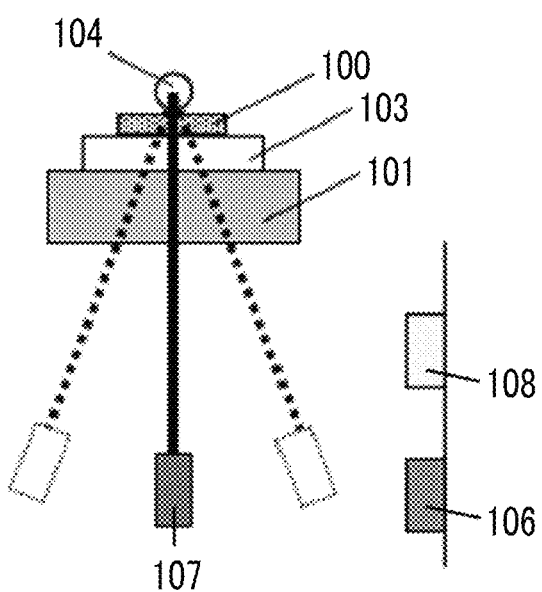
FIG. 2 is an explanatory diagram of the measurement method of a logarithmic decrement.
Figure 3:
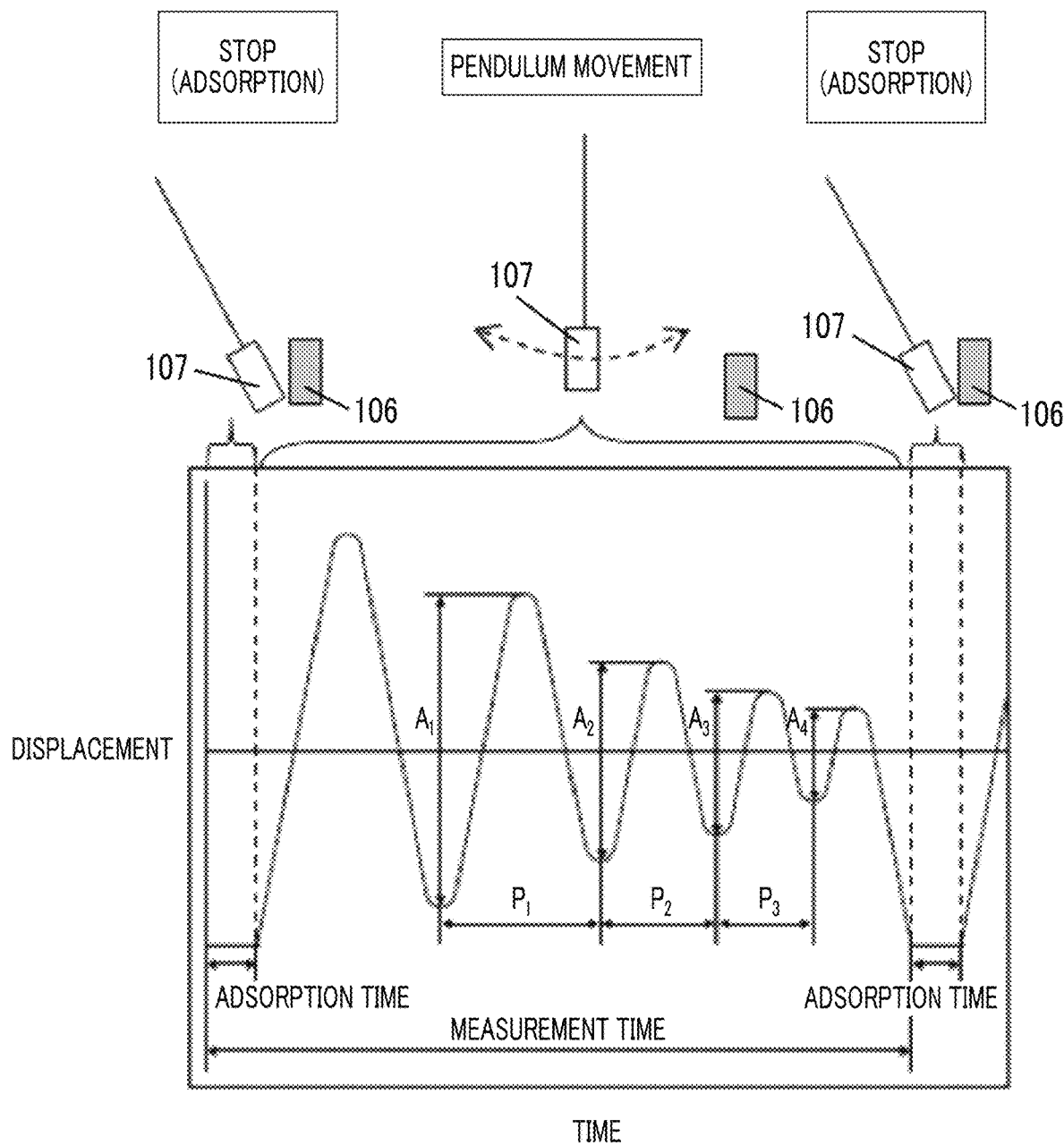
FIG. 3 is an explanatory diagram of the measurement method of a logarithmic decrement.

FIGS. 1 to 3 are explanatory diagrams of a measurement method of the logarithmic decrement. Hereinafter, the measurement method of the logarithmic decrement will be described with reference to the drawings. However, the aspect shown in the drawing is merely an example and the invention is not limited thereto.

A portion of the magnetic tape which is a measurement target (a measurement sample) 100 is placed on a substrate 103 so that a measurement surface (surface of the back coating layer) faces upwards and the measurement sample 100 is fixed by, for example, fixing tapes 105 in a state where obvious wrinkles which can be visually confirmed are not generated, in a sample stage 101 in a pendulum viscoelasticity tester.

A pendulum-attached round-bar type cylinder edge 104 is loaded on the measurement surface of the measurement sample 100 so that a long axis direction of the cylinder edge becomes parallel to a longitudinal direction of the measurement sample 100. An example of a state in which the pendulum-attached round-bar type cylinder edge 104 is loaded on the measurement surface of the measurement sample 100 as described above (state seen from the top) is shown in FIG. 1. In the aspect shown in FIG. 1, a holder and temperature sensor 102 is installed and a temperature of the surface of the substrate 103 can be monitored. However, this configuration is not essential. In the aspect shown in FIG. 1, the longitudinal direction of the measurement sample 100 is a direction shown with an arrow in the drawing, and is a longitudinal direction of a magnetic tape from which the measurement sample is cut out. The description regarding "parallel" and the like disclosed in the specification includes a range of errors allowed in the technical field of the invention. For example, the range of errors means a range of less than ±10° from an exact angle, and the error from the exact angle is preferably equal to or smaller than 5° and more preferably equal to or smaller than 3°. In addition, as a pendulum 107 (see FIG. 2), a pendulum formed of a material having properties of being adsorbed to a magnet formed of metal or an alloy is used.

The temperature of the surface of the substrate 103 on which the measurement sample 100 is placed is set to 80° C. by increasing the temperature at a rate of temperature increase equal to or lower than 5° C./min (random rate of temperature increase may be set, as long as it is equal to or lower than 5° C./min), and the pendulum movement is started (induce initial vibration) by releasing adsorption between the pendulum 107 and a magnet 106. An example of a state of the pendulum 107 which performs the pendulum movement (state seen from the side) is shown in FIG. 2. In the aspect shown in FIG. 2, in the pendulum viscoelasticity tester, the pendulum movement is started by stopping (switching off) the electricity to the magnet (electromagnet) 106 disposed on the lower side of the sample stage to release the adsorption, and the pendulum movement is stopped by restarting (switching on) the electricity to the electromagnet to cause the pendulum 107 to be adsorbed to the magnet 106. As shown in FIG. 2, during the pendulum movement, the pendulum 107 reciprocates the amplitude. From a result obtained by monitoring displacement of the pendulum with a displacement sensor 108 while the pendulum reciprocates the amplitude, a displacement-time curve in which a vertical axis indicates the displacement and a horizontal axis indicates the elapsed time is obtained. An example of the displacement-time curve is shown in FIG. 3. FIG. 3 schematically shows correspondence between the state of the pendulum 107 and the displacement-time curve. The stop (adsorption) and the pendulum movement are repeated at a regular measurement interval, the logarithmic decrement A (no unit) is acquired from the following Expression by using a displacement-time curve obtained in the measurement interval after 10 minutes or longer (may be random time, as long as it is 10 minutes or longer) has elapsed, and this value is set as logarithmic decrement of the surface of the back coating layer of the magnetic tape. The adsorption time of the first adsorption is set as 1 second or longer (may be random time, as long as it is 1 second or longer), and the interval between the adsorption stop and the adsorption start is set as 6 seconds or longer (may be random time, as long as it is 6 seconds or longer). The measurement interval is an interval of the time from the adsorption start and the next adsorption start. In addition, humidity of an environment in which the pendulum movement is performed, may be random relative humidity, as long as the relative humidity is 40% to 70%. Temperature of an environment in which the pendulum movement is performed, may be random temperature, as long as the temperature is 20° C. to 30° C.

$$\Delta = \frac{\ln\left(\frac{A_1}{A_2}\right) + \ln\left(\frac{A_2}{A_3}\right) + \ldots \ln\left(\frac{A_n}{A_{n+1}}\right)}{n}$$

In the displacement-time curve, an interval between a point of the minimum displacement and a point of the next minimum displacement is set as a period of a wave. n indicates the number of waves included in the displacement-time curve in the measurement interval, and An indicates the minimum displacement and maximum displacement of the n-th wave. In FIG. 3, an interval between the minimum displacement of the n-th wave and the next minimum displacement is shown as Pn (for example, $P_1$ regarding the first wave, $P_2$ regarding the second wave, and $P_3$ regarding the third wave). In the calculation of the logarithmic decrement, a difference (in Expression $A_{n+1}$, in the displacement-time curve shown in FIG. 3, $A_4$) between the minimum displacement and the maximum displacement appearing after the n-th wave is also used. However, a part where the pendulum 107 stops (adsorption) after the maximum displacement is not used in the counting of the number of waves. In addition, a part where the pendulum 107 stops (adsorption) before the maximum displacement is not used in the counting of the number of waves, either. Accordingly, the number of waves is 3 (n=3) in the displacement-time curve shown in FIG. 3.

The logarithmic decrement acquired by a pendulum viscoelasticity test performed regarding the surface of the back coating layer of the magnetic tape is equal to or smaller than 0.060. From a viewpoint of further preventing the occurrence of the edge damage, the logarithmic decrement is preferably equal to or smaller than 0.058, more preferably equal to or smaller than 0.055, even more preferably equal to or smaller than 0.050, still preferably equal to or smaller than 0.045, still more preferably equal to or smaller than 0.040, and still even more preferably equal to or smaller than 0.035. The logarithmic decrement can be, for example, equal to or greater than 0.010 or equal to or greater than 0.012. From a viewpoint of further preventing the edge damage preventing occurrence of the edge damage, low logarithmic decrement tends to be preferable. Accordingly, the logarithmic decrement may be lower than the lower limit exemplified described above. A specific aspect of a method for adjusting the logarithmic decrement of the back coating layer surface will be described later.

Hereinafter, the magnetic tape will be described more specifically.

Magnetic Layer

Ferromagnetic Powder

The magnetic layer of the magnetic tape includes ferromagnetic hexagonal ferrite powder as ferromagnetic powder. Regarding the ferromagnetic hexagonal ferrite powder, a magnetoplumbite type (also referred to as an "M type"), a W type, a Y type, and a Z type are known as the crystal structure of the hexagonal ferrite. The ferromagnetic hexagonal ferrite powder included in the magnetic layer may have any crystal structure. In addition, an iron atom and a divalent metal atom are included in the crystal structure of the hexagonal ferrite, as constituent atoms. The divalent metal atom is a metal atom which may become divalent cations as ions, and examples thereof include a barium atom, a strontium atom, an alkali earth metal atom such as calcium atom, and a lead atom. For example, the hexagonal ferrite including a barium atom as the divalent metal atom is a barium ferrite, and the hexagonal ferrite including a strontium atom is a strontium ferrite. In addition, the hexagonal ferrite may be a mixed crystal of two or more hexagonal ferrites. As an example of the mixed crystal, a mixed crystal of the barium ferrite and the strontium ferrite can be used.

As an index for a particle size of the ferromagnetic hexagonal ferrite powder, an activation volume can be used. The "activation volume" is a unit of magnetization reversal. Regarding the activation volume described in the invention and the specification, magnetic field sweep rates of a coercivity He measurement part at time points of 3 minutes and 30 minutes are measured by using an oscillation sample type magnetic-flux meter in an environment of an atmosphere temperature 23° C.±1° C., and the activation volume is a value acquired from the following relational expression of He and an activation volume V.

$$He = 2Ku/Ms \{1-[(kT/KuV)In(At/0.693)]^{1/2}\}$$

[In the expression, Ku: anisotropy constant, Ms: saturation magnetization, k: Boltzmann's constant, T: absolute temperature, V: activation, volume, A: spin precession frequency, and t: magnetic field reversal time]

As a method for achieving high-density recording, a method of decreasing a particle size of ferromagnetic powder included in a magnetic layer and increasing a filling percentage of the ferromagnetic powder of the magnetic layer is used. From this viewpoint, the activation volume of the ferromagnetic hexagonal ferrite powder is preferably equal to or smaller than 2,500 nm$^3$, more preferably equal to or smaller than 2,300 nm$^3$, and even more preferably equal to or smaller than 2,000 nm$^3$. Meanwhile, from a viewpoint of stability of magnetization, the activation volume is, for example, preferably equal to or greater than 800 nm$^3$, more preferably equal to or greater than 1,000 nm$^3$, and even more preferably equal to or greater than 1,200 nm$^3$.

The shape of the particle configuring the ferromagnetic hexagonal ferrite powder is specified by imaging the ferromagnetic hexagonal ferrite powder at a magnification ratio of 100,000 with a transmission electron microscope, and tracing an outline of a particle (primary particle) with a digitizer on a particle image obtained by printing the image on printing paper so that the total magnification of 500,000. The primary particle is an independent particle which is not aggregated. The imaging with a transmission electron microscope is performed by a direct method with a transmission electron microscope at an acceleration voltage of 300 kV. The transmission electron microscope observation and measurement can he, for example, performed with a transmission electron microscope 14-9000 manufactured by Hitachi, Ltd. and image analysis software KS-400 manufactured by Carl Zeiss. Regarding the shape of the particle configuring the ferromagnetic hexagonal ferrite powder, a "planar shape" is a shape having two plate surfaces facing each other. Meanwhile, among the shapes of the particles not having such a plate surface, a shape having distinguished long axis and short axis is an "elliptical shape". The long axis is determined as an axis (linear line) having the longest length of the particle. In contrast, the short axis is determined as an axis having the longest length of the particle in a linear line orthogonal to the long axis. A shape not having distinguished long axis and short axis, that is, a shape in which the length of the long axis is the same as the length of the short axis is a "sphere shape". From the shapes, a shape in which the long axis and the short axis are hardly specified, is called an undefined shape. The imaging with a transmission electron microscope for specifying the shapes of the particles is performed without performing the alignment process with respect to the imaging target powder. The shape of the ferromagnetic hexagonal ferrite powder used for the preparation of the magnetic layer forming composition and the ferromagnetic hexagonal ferrite powder included in the magnetic layer may be any one of the planar shape, the elliptical shape, the sphere shape, and the undefined shape.

An average particle size of various powders disclosed in the invention and the specification is an arithmetical mean of the values obtained regarding randomly extracted 500 particles by using the particle image which is captured as described above. The average particle size shown in the examples which will be described later is a value obtained by using transmission electron microscope H-9000 manufactured by Hitachi, Ltd. as the transmission electron microscope and image analysis software KS-400 manufactured by Carl Zeiss as the image analysis software.

For details of the ferromagnetic hexagonal ferrite powder, descriptions disclosed in paragraphs 0134 to 0136 of JP2011-216149A can be referred to, for example.

The content (filling percentage) of the ferromagnetic hexagonal ferrite powder of the magnetic layer is preferably 50% to 90% by mass and more preferably 60% to 90% by mass. The components other than the ferromagnetic hexagonal ferrite powder of the magnetic layer are at least a binding agent and non-magnetic powder, and one or more kinds of additives can be randomly included. A high filling percentage of the ferromagnetic hexagonal ferrite powder of the magnetic layer is preferable, from a viewpoint of improving recording density.

Binding Agent and Curing Agent

The magnetic tape is a coaxing type magnetic tape, and the magnetic layer includes a binding agent. The binding agent is one or more kinds of resin. As the binding agent, various resins normally used as a binding agent of the coating type magnetic recording medium can be used. For example, as the binding agent, a resin selected from a polyurethane resin, a polyester resin, a polyamide resin, a vinyl chloride resin, an acrylic resin obtained by copolymerizing styrene, acrylonitrile, or methyl methacrylate, a cellulose resin such as nitrocellulose, an epoxy resin, a phenoxy resin, and a polyvinylalkylal resin such as polyvinyl acetal or polyvinyl butyral can be used alone or a plurality of resins can be mixed with each other to be used. Among these, a polyurethane resin, an acrylic resin, a cellulose resin, and a vinyl chloride resin are preferable. These resins may be a homopolymer or a copolymer. These resins can be used as the binding agent even in the back coating layer and/or the non-magnetic layer which will be described later. For the binding agent described above, description disclosed in paragraphs 0028 to 0031 of JP2010-24113A can be referred to. An average molecular weight of the resin used as the binding agent can be, for example, 10,000 to 200,000 as a weight-average molecular weight. The weight-average molecular weight of the invention and the specification is a value obtained by performing polystyrene conversion of a value measured by gel permeation chromatography (GPC). As the, measurement conditions, the following conditions can be used. The weight-average molecular weight shown in examples which will be described later is a value obtained by performing polystyrene conversion of a value measured under the following measurement conditions.

GPC device: HLC-8120 (manufactured by Tosoh Corporation)

Column: TSK gel Multipore HXL-M (manufactured by Tosoh Corporation, 7.8 mmID (inner diameter)×30.0 cm)

Fluent: Tetrahydrofuran (THF)

A curing agent can also be used together with a resin which can be used as the binding agent. As the curing agent, in one aspect, a thermosetting compound which is a compound in which a curing reaction (crosslinking reaction) proceeds due to heating can be used, and in another aspect, a photocurable compound in which a curing reaction (crosslinking reaction) proceeds due to light irradiation can be used. At least a part of the curing agent is included in the magnetic layer in a state of being reacted (crosslinked) with other components such as the binding agent, by proceeding the curing reaction in the magnetic layer forming step. In a case where a composition used for forming other layers such as the back coating layer forming composition includes a curing agent, the same applies to a layer formed by using this composition. The preferred curing agent is a thermosetting compound, polyisocyanate is suitable. For details of the polyisocyanate, descriptions disclosed in paragraphs 0124 and 0125 of JP2011-216149A can be referred to, for example. The amount of the curing agent can be, for example, 0 to 80.0 parts by mass with respect to 100.0 parts by mass of the binding agent in the magnetic layer forming composition, and is preferably 50.0 to 80.0 parts by mass, from a viewpoint of improvement of strength of the magnetic layer, Non-Magnetic Powder Examples of non-magnetic powder include in the magnetic layer include non-magnetic powder which can function as a projection formation agent which forms projections suitably protruded from the surface of the magnetic layer (for example, referred to as a "projection formation agent"), and non-magnetic powder which can function as an abrasive (for example, referred to as an "abrasive"). The inventors have surmised that, in the magnetic layer having the XRD intensity ratio of 0.5 to 4.0, the sinking of the particles of the non-magnetic powder into the magnetic layer which can be suitably controlled, causes prevention of the occurrence of the edge damage. Details of such a surmise are as described above.

As the projection formation agent which is one aspect of the non-magnetic powder, various non-magnetic powders normally used as a projection formation agent can he used. These may be inorganic substances or organic substances. In one aspect, from a viewpoint of homogenization of friction properties, particle size distribution of the projection formation agent is not polydispersion having a plurality of peaks in the distribution and is preferably monodisperse showing a single peak. From a viewpoint of availability of monodisperse particles, the projection formation agent is preferably powder of inorganic substances (inorganic powder). Examples of the inorganic powder include powder of inorganic oxide such as metal oxide, metal carbonate, metal sulfate, metal nitride, metal carbide, and metal sulfide, and powder of inorganic oxide is preferable. The projection formation agent is more preferably colloid particles and even more preferably inorganic oxide colloid particles. In addition, from a viewpoint of availability of monodisperse particles, the inorganic oxide configuring the inorganic oxide colloid particles are preferably silicon dioxide (silica). The inorganic oxide colloid particles are more preferably colloidal silica (silica colloid particles). In the invention and the specification, the "colloid particles" are particles which are not precipitated and dispersed to generate a colloidal dispersion, in a case where 1 g of the particles is added to 100 mL of at least one organic solvent of at least methyl ethyl ketone, cyclohexanone, toluene, or ethyl acetate, or a mixed solvent including two or more kinds of the solvent described above at a random mixing ratio. In addition, in another aspect, the projection formation agent is preferably carbon black.

An average particle size of the projection formation agent is, for example, 30 to 300 nm and is preferably 40 to 200 nm.

The abrasive which is another aspect of the non-magnetic powder is preferably non-magnetic powder having Mohs hardness exceeding 8 and more preferably non-magnetic powder having Mohs hardness equal to or greater than 9. A maximum value of Mohs hardness is 10 of diamond. Specifically, powders of alumina ($Al_2O_3$), silicon carbide, boron carbide ($B_4C$), $SiO_2$, TiC, chromium oxide ($Cr_2O_3$), cerium oxide zirconium oxide ($ZrO_2$), iron oxide, diamond, and the like can be used, and among these, alumina powder such as α-alumina and silicon carbide powder are preferable. In addition, regarding the particle size of the abrasive, a specific surface area which is an index for the particle size is, for example, equal to or greater than 14 $m^2/g$, and is preferably 16 $m^2/_2$ and more preferably 18 $m^2/g$. Further, the specific surface area of the abrasive can be, for example, equal to or smaller than 40 $m^2/g$. The specific surface area is a value obtained by a nitrogen adsorption method (also referred to as a Brunauer-Emmett-Teller (BET) 1 point method), and is a value measured regarding primary particles. Hereinafter, the specific surface area obtained by such a method is also referred to as a BET specific surface area.

In addition, from a viewpoint that the projection formation agent and the abrasive can exhibit the functions thereof in more excellent manner, the content of the projection formation agent in the magnetic layer is preferably 1.0 to 4.0 parts by mass and more preferably 1.5 to 3.5 parts by mass with respect to 100,0 parts by mass of the ferromagnetic hexagonal ferrite powder. Meanwhile, the content of the abrasive in the magnetic layer is preferably 1.0 to 20.0 parts by mass, more preferably 3.0 to 15.0 parts by mass, and even more preferably 4.0 to 10.0 parts by mass with respect to 100.0 parts by mass of the ferromagnetic hexagonal ferrite powder.

Other Components

The magnetic layer may include one or more kinds of additives, if necessary, together with the various components described above. As the additives, a commercially available product can be suitably selected and used according to the desired properties. Alternatively, a compound synthesized by a well-known method can he used as the additives. As the additives, the curing agent described above is used as an example. In addition, examples of the additive which can be included in the magnetic layer include a lubricant, a dispersing agent, a dispersing assistant, an antibacterial agent, an antistatic agent, and an antioxidant. For example, as the dispersing agent, a well-known dispersing agent such as a carboxy group-containing compound or a nitrogen-containing compound can be used. For example, the nitrogen-containing compound may be any of a primary amine represented by $NH_2R$, secondary amine represented by $NHR_2$, and a tertiary amine represented by $NR_3$. In the above description, R represents a random structure configuring the nitrogen-containing compound, and a plurality of Rs may be the same as each other or different from each other. The nitrogen-containing compound may be a compound (polymer) having a plurality of repeating structure in a molecule. It is thought that a nitrogen-containing part of the nitrogen-containing compound which functions as an adsorption part to the surface of the particle of the ferromagnetic hexagonal ferrite powder is a reason why the nitrogen-containing compound can function as the dispersing agent. As the carboxy group-containing compound, fatty acid such as oleic acid can be used, for example. It is thought that a carboxy group which functions as an adsorption part to the surface of the particle of the ferromagnetic hexagonal ferrite powder is a reason why the carboxy group-containing compound can function as the dispersing agent. It is also preferable to use the carboxy group-containing compound and the nitrogen-containing compound in combination.

As an example of the additive which can be used in the magnetic layer including the abrasive, a dispersing agent disclosed in paragraphs 0012 to 0022 of JP2013-131285A can be used as a dispersing agent for improving dispersibility of the abrasive of the magnetic layer forming composition. It is preferable to improve dispersibility of the non-magnetic powder such as the abrasive in the magnetic layer forming composition, in order to decrease the magnetic layer surface roughness Ra.

Back Coating Layer

The magnetic tape includes a back coating layer on a surface side of the non-magnetic support opposite to the surface including the magnetic layer. As non-magnetic powder of the back coating layer, any one or both of carbon black and non-magnetic powder other than the carbon black can be used. As the non-magnetic powder other than the carbon black, non-magnetic inorganic powder can be used. Specific examples thereof include non-magnetic inorganic powder of iron oxide such as α-iron oxide, titanium oxide such as titanium dioxide, cerium oxide, tin oxide, tungsten oxide, ZnO, $ZrO_2$, $SiO_2$, $Cr_2O3$, α-alumina, β-alumina, γ-alumina, goethite, corundum, silicon nitride, titanium carbide, magnesium oxide, boron nitride, molybdenum disulfide, copper oxide, $MgCO_3$, $CaCO_3$, $BaCO_3$, $SrCO_3$, $BaSO_4$, silicon carbide, and titanium carbide. The preferable non-magnetic inorganic powder is non-magnetic inorganic oxide powder, more preferably α-iron oxide and titanium oxide, and even more preferably α-iron oxide.

A shape of the non-magnetic powder other than carbon black may be any of a needle shape, a sphere shape, a polyhedron shape, and a planar shape. An average particle size of the non-magnetic powder is preferably 0.005 to 2.00 μm and more preferably 0.01 to 0.20 μm. In addition, a specific surface area of the non-magnetic powder obtained by a Brunauer-Emmett-Teller (BET) method (BET specific surface area) is preferably I to 100 $m^2/g$, more preferably 5 to 70 $m^2/g$, and even more preferably 10 to 65 $m^2/g$. Meanwhile, an average particle size of carbon black is, for example, 5 to 80 nm, preferably 10 to 50 nm, and more preferably 10 to 40 nm. For the content (filling percentage) of the non-magnetic powder in the back coating layer, the description which will be described later regarding the non-magnetic powder of the non-magnetic layer can he referred to.

The back coating layer further includes a binding agent and can randomly include well-known additives. For other details of the binding agent and additives of the back coating layer, a well-known technology regarding the back coating layer can be applied, and a well-known technology regarding the magnetic layer and/or the non-magnetic layer can also be applied. The back coating layer can be formed through a curing step, preferably; by using the back coating layer forming composition including a curing agent. The curing agent is as described above regarding the curing agent which can be used in the magnetic layer. The amount of the curing agent added and used in the back coating layer forming composition can be, for example, 5.0 to 50.0 parts by mass with respect to 100.0 parts by mass of the binding agent.

Non-Magnetic Layer

Next, the non-magnetic layer will be described. The magnetic tape may include a magnetic layer directly on a surface of a non-magnetic support, or may include a magnetic layer through the non-magnetic layer including non-magnetic powder and a binding agent on the surface of the non-magnetic support. The non-magnetic powder used in the non-magnetic layer may be inorganic powder or organic powder. In addition, carbon black and the like can be used. Examples of the inorganic powder include powders of metal, metal oxide, metal carbonate, metal sulfate, metal nitride, metal carbide, and metal sulfide. These non-magnetic powder can be purchased as a commercially available product or can be manufactured by a well-known method. For details thereof, descriptions disclosed in paragraphs 0146 to 0150 of JP2011-216149A can be referred to. For carbon black which can be used in the non-magnetic layer, descriptions disclosed in paragraphs 0040 and 0041 of JP2010-24113A can be referred to. The content (filling percentage) of the non-magnetic powder of the non-magnetic layer is preferably 50% to 90% by mass and more, preferably 60% to 90% by mass.

In regards to other details of a binding agent or additives of the non-magnetic layer, the well-known technology regarding the non-magnetic layer can be applied. in addition, in regards to the type and the content of the binding agent, and the type and the content of the additive, for example, the well-known technology regarding the magnetic layer can be applied.

The non-magnetic layer of the magnetic tape also includes a substantially non-magnetic layer including a small amount of ferromagnetic powder as impurities or intentionally, together with the non-magnetic powder. Here, the substantially non-magnetic layer is a layer having a residual magnetic flux density equal to or smaller than 10 mT, a layer having coercivity equal to or smaller than 7.96 kA/m(100 Oe), or a layer having a residual magnetic flux density equal to or smaller than 10 mT and coercivity equal to or smaller than 7.96 kA/m(100 Oe). It is preferable that the non-magnetic layer does not have a residual magnetic flux density and coercivity.

Non-Magnetic Support

Next, the non-magnetic support (hereinafter, also simply referred to as a "support") will be described. As the non-magnetic support, well-known components such as polyethylene terephthalate, polyethylene naphthalate, polyamide, polyamide imide, aromatic polyamide subjected to biaxial stretching are used. Among these, polyethylene terephthalate, polyethylene naphthalate, and polyamide are preferable. Corona discharge, plasma treatment, easy-bonding treatment, or heating treatment may be performed with respect to these supports in advance.

Various Thickness

The thickness of the non-magnetic support is preferably 3.00 to 20.00 μm, more preferably 3.00 to 10.00 μm, even more preferably 3.00 to 6.00 μm, and particularly preferably 3.00 to 4.50 μm, The thickness of the magnetic layer is preferably equal to or smaller than 0.15 μm and more preferably equal to or smaller than 0.10 μm, from a viewpoint of realizing recording at high density which is recently required. The thickness of the magnetic layer is even more preferably 0.01 to 0.10 μm. The magnetic layer may be at least single layer, the magnetic layer may he separated into two or more layers having different magnetic properties, and a configuration of a well-known multilayered magnetic layer can be applied. A thickness of the magnetic layer in a case where the magnetic layer is separated into two or more layers is the total thickness of the layers.

A thickness of the non-magnetic layer is, for example, 0.10 to 1.50 μm and preferably 0.10 to 1.00 μm.

A thickness of the back coating layer is preferably equal to or smaller than 0.90 μm, more preferably 0.10 to 0.70 μm, even more preferably 0.10 to 0.55 μm, and still more preferably 0.10 to 0.50 μm.

The thicknesses of various layers of the magnetic tape and the non-magnetic support can be acquired by a well-known film thickness measurement method. As an example, a cross section of the magnetic tape in a thickness direction is, for example, exposed by a well-known method of ion beams or microtome, and the exposed cross section is observed With a scanning electron microscope. In the cross section observation, various thicknesses can be acquired as a thickness acquired at one position of the cross section in the thickness direction, or an arithmetical mean of thicknesses acquired at a plurality of positions of two or more positions, for example, two positions which are randomly extracted. In addition, the thickness of each layer may be acquired as a designed thickness calculated according to the manufacturing conditions.

Manufacturing Method

Preparation of Each Layer Forming Composition

Each composition for forming the magnetic layer, the back coating layer, or the non-magnetic layer, normally includes a solvent, together with various components described above. As the solvent, various organic solvents generally used for manufacturing a coating type magnetic recording medium can be used. Among those, from a viewpoint of solubility of the binding agent normally used in the coating type magnetic recording medium, each layer forming composition preferably includes one or more ketone solvents such as acetone, methyl ethyl ketone, methyl isobutyl ketone, diisobutyl ketone, cyclohexanone, isophorone, and tetrahydrofuran. The amount of the solvent of each layer forming composition is not particularly limited, and can be set to be the same as that of each layer forming composition of a typical coating type magnetic recording medium. In addition, steps of preparing a composition for forming each layer can generally include at least a kneading step, a dispersing step, and a mixing step provided before and after these steps, if necessary. Each step may be divided into two or more stages. All of raw materials used in the invention may be added at an initial stage or in a middle stage of each step. In addition, each raw material may be separately added in two or more steps. For example, a binding agent may be separately added in a kneading step, a dispersing step, and a mixing step for adjusting viscosity after the dispersion, in the manufacturing step of the magnetic tape, a well-known manufacturing technology of the related art can be used in a part or all of the steps. In the kneading step, an open kneader, a continuous kneader, a pressure kneader, or a kneader having a strong kneading force such as an extruder is preferably used. The details of the kneading processes of these kneaders are disclosed in JP1989-106338A (JP-H01-106338A) and JP1989-79274A (JP-H01-79274A). As a dispersing machine, a well-known dispersing machine can be used. The each layer forming composition may be filtered by a well-known method before performing the coating step. The filtering can be performed by using a filter, for example. As the filter used in the filtering, a filter having a hole diameter of 0.01 to 3 μm (for example, filter made of glass fiber or filter made of polypropylene) can be used, for example.

Regarding the dispersion process of the magnetic layer forming composition, it is preferable to prevent the occurrence of chipping as described above. In order to realize the prevention, it is preferable to perform the dispersion process of the ferromagnetic hexagonal ferrite powder by a dispersion process having two stages, in which a coarse aggregate of the ferromagnetic hexagonal ferrite powder is crushed by the dispersion process in a first stage, and the dispersion process in a second stage, in which a collision energy applied to particles of the ferromagnetic hexagonal ferrite powder due to collision with the dispersion beads is smaller than that in the first dispersion process, is performed, in the step of preparing the magnetic layer forming composition. According to such a dispersion process, it is possible to improve dispersibility of the ferromagnetic hexagonal ferrite powder and prevent the occurrence of chipping.

As a preferred aspect of the dispersion process having two stages, a dispersion process including a first Stage of obtaining a dispersion liquid by performing the dispersion process of the ferromagnetic hexagonal ferrite powder, the binding agent, and the solvent under the presence of first dispersion beads, and a second stage of performing the dispersion process of the dispersion liquid obtained in the first stage under the presence of second dispersion beads having smaller bead diameter and density than those of the first dispersion beads can be used. Hereinafter, the dispersion process of the preferred aspect described above will be further described.

In order to increase the dispersibility of the ferromagnetic hexagonal ferrite powder, the first stage and the second stage are preferably performed as the dispersion process before mixing the ferromagnetic hexagonal ferrite powder and other powder components. For example, in a case of forming the magnetic layer including the non-magnetic powder, the first stage and the second stage are preferably performed as a dispersion process of a solution (magnetic liquid) including ferromagnetic hexagonal ferrite powder, a binding agent, a solvent, and randomly added additives, before mixing the non-magnetic powder.

A bead diameter of the second dispersion bead is preferably equal to or smaller than 1/100 and more preferably equal to or smaller than 1/500 of a bead diameter of the first dispersion bead. The bead diameter of the second dispersion bead can be, for example, equal to or greater than 1/10,000 of the head diameter of the first dispersion bead. However, there is no limitation to this range. The bead diameter of the second dispersion bead is, for example, preferably 80 to 1,000 nm. Meanwhile, the bead diameter of the first dispersion bead can be, for example, 0.2 to 1.0 mm.

The bead diameter of the invention and the specification is a value measured by the same method as the measurement method of the average particle size of the powder described above.

The second stage is preferably performed under the conditions in which the amount of the second dispersion beads is equal to or greater than 10 times of the amount of the ferromagnetic hexagonal ferrite powder, and is more preferably performed under the conditions in which the amount of the second dispersion beads is 10 times to 30 times of the amount of the ferromagnetic hexagonal ferrite powder, based on mass.

Meanwhile, the amount of the dispersion beads in the first stage is preferably in the range described above.

The second dispersion beads are beads having lower density than that of the first dispersion beads. The "density" is obtained by dividing the mass (unit: g) of the dispersion beads by volume (unit: $cm^3$). The measurement is performed by the Archimedes method. The density of the second dispersion beads is preferably equal to or lower than 3.7 $g/cm^3$ and more preferably equal to or lower than 3.5 $g/cm^3$. The density of the second dispersion beads may be, for example, equal to or higher than 2.0 $g/cm^3$ or may be lower than 2.0 $g/cm^3$. As the preferred second dispersion beads from a viewpoint of density, diamond beads, silicon carbide beads, or silicon nitride beads can be used, and as preferred second dispersion beads from a viewpoint of density and hardness, diamond beads can be used.

Meanwhile, as the first dispersion beads, dispersion beads having density exceeding 3.7 $g/cm^3$ are preferable, dispersion beads having density equal to or higher than 3.8 $g/cm^3$ are more preferable, and dispersion beads having density equal to or higher than 4.0 $g/cm^3$ are even more preferable. The density of the first dispersion beads may be, for example, equal to or smaller than 7.0 $g/cm^3$ or may exceed 7.0 $g/cm^3$. As the first dispersion beads, zirconia beads or alumina beads are preferably used, and zirconia beads are more preferably used.

The dispersion time is not particularly limited and may he set in accordance with the kind of a dispersing machine used.

Coating Step, Cooling Step, Heating and Drying Step, Burnishing Treatment Step, and Curing Step The magnetic layer can be formed by directly applying the magnetic layer forming composition onto the surface of the non-magnetic support or by performing multilayer coating of the magnetic layer forming composition with the non-magnetic layer forming composition in order or at the same time. For details of the coating for forming each layer, a description disclosed in paragraph 0066 of JP2010-231843A can be referred to.

In a preferred aspect, the magnetic tape can be manufactured by successive multilayer coating of the non-magnetic layer forming composition and the magnetic layer forming composition. A manufacturing step including the successive multilayer coating can be preferably performed as follows. The non-magnetic layer is formed through a coating step of applying a non-magnetic layer forming composition onto a surface of a non-magnetic support to form a coating layer, and a heating and drying step of drying the formed coating layer by a heating process. In addition, the magnetic layer can be formed through a coating step of applying a magnetic layer forming composition onto the surface of the formed non-magnetic layer to form a coating layer, and a heating and drying step of drying the formed coating layer by a heating process.

Meanwhile, the back coating layer is formed on a surface side of the non-magnetic support opposite to the surface where the magnetic layer is formed (or is to be formed). The back coating layer can be preferably formed through a coating step of applying a back coating layer forming composition onto a surface of a non-magnetic support to form a coating layer, and a heating and drying step of drying the formed coating layer by a heating process.

In a preferred aspect, the magnetic tape can be manufactured by a manufacturing method in which a back coating layer forming step includes a coating step of applying a back coating layer forming composition including non-magnetic powder, a binding agent, a curing agent, and a solvent onto a surface of a non-magnetic support to form a coating layer, a heating and drying step of drying the coating layer by a heating process, and a curing step of performing a curing process with respect to the coating layer, a cooling step of cooling the coating layer is included between the coating step and the heating and drying step, and a burnishing treatment step of performing a burnishing treatment with respect to the surface of the coating layer is included between the heating and drying step and the curing step.

The inventors have thought that it is preferable to perform the cooling step and the burnishing treatment step in the back coating layer forming step of the manufacturing method, in order to set the logarithmic decrement measured regarding the surface of the back coating layer to be equal to or smaller than 0.060. A more specific description is as follows.

The inventors have surmised that performing the cooling step of cooling the coating layer between the coating step and the heating and drying step contributes to causing pressure sensitive adhesive component separated from the surface of the back coating layer to be localized in the surface and/or a surface layer part in the vicinity of the surface of the coating layer. The inventors have thought that this is because the pressure sensitive adhesive component at the time of solvent volatilization in the heating and drying step is easily moved to the surface and/or the surface layer part of the coating layer, by cooling the coating layer before the heating and drying step. However, the reason thereof is not clear. In addition, the inventors have thought that the pressure sensitive adhesive component can be removed by performing the burnishing treatment with respect to the surface of the coating layer in which the pressure sensitive adhesive component is localized on the surface and/or surface layer part. The inventors have surmised that performing the curing step after removing the pressure sensitive adhesive component as described above contributes to the setting of the logarithmic decrement measured regarding the surface of the back coating layer to be equal to or smaller than 0.060. However, this is merely a surmise, and the invention is not limited thereto.

Hereinafter, a specific aspect of the manufacturing method of the magnetic tape will be described with reference to FIG. 4, as an example. However, the invention is not limited to the following specific aspect.

Figure 4:
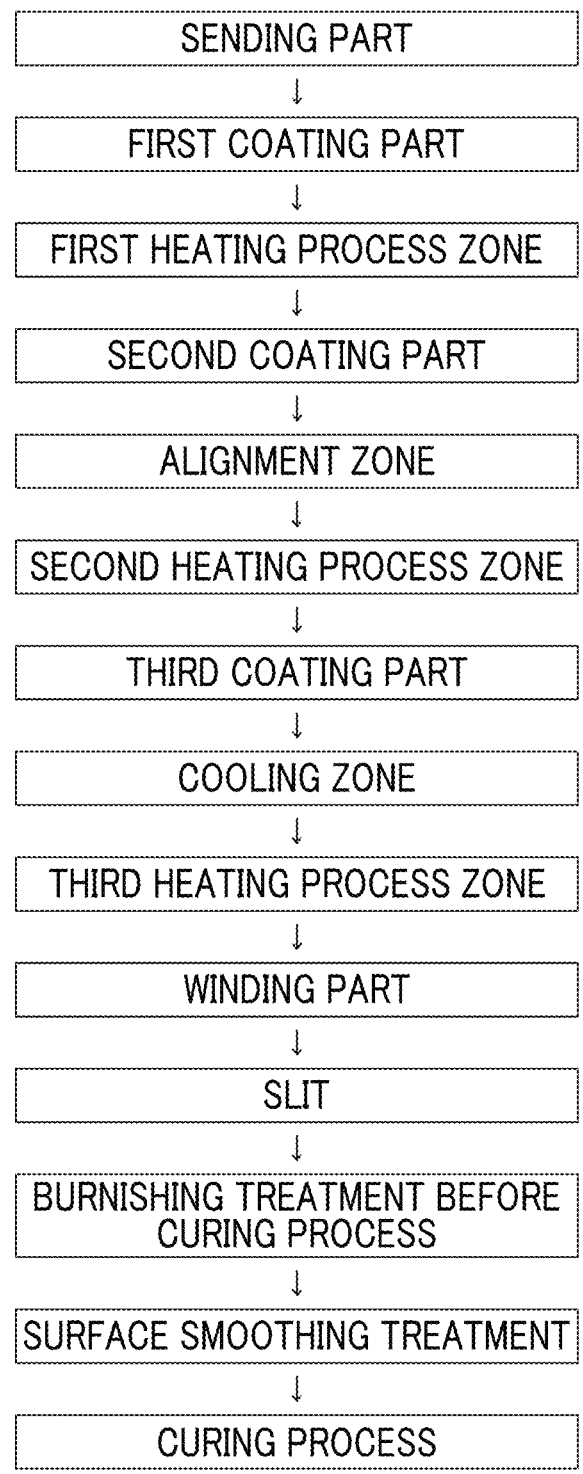
FIG. 4 shows an example (step schematic view) of a specific aspect of a magnetic tape manufacturing step.

FIG. 4 is a step schematic view showing a specific aspect of a step of manufacturing the magnetic tape including a non-magnetic layer and a magnetic layer in this order on one surface side of a non-magnetic support and including a back coating layer on the other surface side thereof. In the aspect shown in FIG. 4, an operation of sending a non-magnetic support (elongated film) from a sending part and winding the non-magnetic support around a winding part is continuously performed, and various processes of coating, drying, and alignment are performed in each part or each zone shown in FIG. 4, and thus, it is possible to sequentially form a non-magnetic layer and a magnetic layer on one surface side of the running non-magnetic support by multilayer coating and to form a back coating layer on the other surface side thereof. Such a manufacturing step can be set to be identical to the manufacturing method normally performed for manufacturing a coating type magnetic recording medium, except for including a cooling zone in the back coating layer forming step and including the burnishing treatment step before the curing process.

The non-magnetic layer forming composition is applied onto the non-magnetic support sent from the sending part in a first coating part, and a coating layer of the non-magnetic layer forming composition is formed (coating step of non-magnetic layer forming composition).

In a first heating process zone, the coating layer of the non-magnetic layer forming composition is dried by heating the formed coating layer (heating and drying step). The heating and drying process can be performed by causing the non-magnetic support including the coating layer after the coating step to pass through the heated atmosphere. An atmosphere temperature of the heated atmosphere here is, for example, approximately 60° to Here, the atmosphere temperature may be a temperature at which the solvent is volatilized and the coating layer is dried, and the atmosphere temperature is not limited to the range described above. In addition, the heated air may blow to the surface of the coating layer. The points described above are also applied to a heating and drying step of a second heating process zone and a heating and drying step of a third heating process zone which will be described later, in the same manner.

Next, in a second coating part, the magnetic layer forming composition is applied onto the surface of the non-magnetic layer formed by performing the heating and drying step in the first heating process zone, and a coating layer of the magnetic layer forming composition is formed (coating step of magnetic layer forming composition).

After that, while the coating layer of the magnetic layer forming composition is wet, an alignment process of the ferromagnetic hexagonal ferrite powder in the coating layer is performed in an alignment zone. For the alignment process, various well-known technologies such as a description disclosed in a paragraph 0067 of JP2010-231843A can be used. As described above, it is preferable to perform the homeotropic alignment process as the alignment process, from a viewpoint of controlling the XRD intensity ratio. Regarding the alignment process, the above description can also be referred to.

The coating layer after the alignment process is subjected to the heating and drying step in the second heating process zone.

Next, in the third coating part, a back coating layer forming composition is applied to a surface of the non-magnetic support on a side opposite to the surface where the non-magnetic layer and the magnetic layer are formed, to form a coating layer (coating step of back coating layer forming composition).

After the coating step, a coating layer of the back coating layer forming composition formed in the coating step is cooled in a cooling zone (cooling step). For example, it is possible to perform the cooling step by allowing the non-magnetic support on which the coating layer is formed to pass through a cooling atmosphere. An atmosphere temperature of the cooling atmosphere is preferably −10° C. to 0° C. and more preferably −5° C. to 0° C. The time for performing the cooling step (for example, time while a random part of the coating layer is delivered to and sent from the cooling zone (hereinafter, also referred to as a "staying time")) is not particularly limited. In a case where the staying time is long, the value of logarithmic decrement tends to be increased. Thus, the staying time is preferably adjusted by performing preliminary experiment if necessary, so that the logarithmic decrement equal to or smaller than 0.060 is realized. In the cooling step, cooled air may blow to the surface of the coating layer.

After that, the coating layer after the cooling step is heated and dried in the third heating process zone.

By doing so, it is possible to obtain the magnetic tape including the non-magnetic layer and the magnetic layer in this order on one surface side of the non-magnetic support, and the coating layer of the back coating layer forming composition heated and dried on the other surface side thereof. The magnetic tape obtained here becomes a magnetic tape product after performing various processes which will be described later.

The obtained Magnetic tape is wound around the winding part, and cut (slit) to have a size of a magnetic tape product. The slitting is performed by using a well-known cutter.

in the slit magnetic tape, the burnishing treatment is performed with respect to the surface of the heated and dried coating layer of the back coating layer forming composition, before performing the curing process (heating and light irradiation) in accordance with the types of the curing agent included in the back coating layer forming composition (burnishing treatment step between heating and drying step and curing step). The inventors have surmised that removing the pressure sensitive adhesive component transitioned to the surface and/or the surface layer part of the coating layer cooled in the cooling zone by the burnishing treatment contributes setting the logarithmic decrement to be equal to or smaller than 0.060. However, as described above, this is merely a surmise, and the invention is not limited thereto.

The burnishing treatment is treatment of rubbing a surface of a treatment target with a member (for example, a polishing tape, or a grinding tool such as a grinding blade or a grinding wheel), and can be performed in the same manner as the well-known burnishing treatment for manufacturing a coating type magnetic recording medium. However, in the related art, the burnishing treatment was not performed in a stage before the curing step, after performing the cooling step and the heating and drying step. With respect to this, the logarithmic decrement can be equal to or smaller than 0.060 by performing the burnishing treatment in the stage described above.

The burnishing treatment can be preferably performed by performing one or both of rubbing of the surface of the coating layer of the treatment target by a polishing tape (polishing) and rubbing of the surface of the coating layer of the treatment target by a grinding tool (grinding). As the polishing tape, a commercially available product may be used and a polishing tape manufactured by a well-known method may be used. As the grinding tool, a well-known blade such as a fixed blade, a diamond wheel, or a rotary blade, or a grinding wheel can be used. In addition, a wiping treatment of wiping the surface of the coating layer rubbed by the polishing tape and/or the grinding tool with a wiping material. For details of preferred polishing tape, grinding tool, burnishing treatment, and wiping treatment, descriptions disclosed in paragraphs 0034 to 0048, FIG. 1 and examples of JP1994-52544A (JP-H06-52544A) can be referred to. As the burnishing treatment is reinforced, the value of the logarithmic decrement tends to be decreased. The burnishing treatment can be reinforced as an abrasive having high hardness is used as the abrasive included in the polishing tape, and can be reinforced, as the amount of the abrasive in the polishing tape is increased. In addition, the burnishing treatment can be reinforced as a grinding tool having high hardness is used as the grinding tool. In regards to the burnishing treatment conditions, the burnishing treatment can be reinforced as a sliding speed between the surface of the coating layer of the treatment target and a member (for example, a polishing tape or a grinding tool) is increased. The sliding speed can be increased by increasing one or both of a speed at which the member is moved, and a speed at which the magnetic tape of the treatment target is moved.

After the burnishing treatment (burnishing treatment step), the curing process is performed with respect to the coating layer of the back coating layer forming composition. In the aspect shown in FIG. 4, the coating layer of the back coating layer forming composition is subjected to the surface smoothing treatment, after the burnishing treatment and before the curing process. The surface smoothing treatment is a process performed for increasing smoothness of the surface of the magnetic layer and/or the surface of the back coating layer of the magnetic tape and is preferably performed by a calender process. For details of the calender process, for example, description disclosed in a paragraph 0026 of JP2010-231843A can be referred to. As the calender process is reinforced, the surface of the magnetic tape can be smoothened (that is, the value of the magnetic layer surface roughness Ra can be decreased). The calender process is reinforced, as the surface temperature (calender temperature) of a calender roll is increased and/or as calender pressure is increased.

After that, the curing process according to the type of the curing agent included in the coating layer is performed with respect to the coating layer of the back coating layer forming composition (curing step). The curing process can be performed by the process according to the type of the curing agent included in the coating layer, such as a heating process or light irradiation. The curing process conditions are not particularly limited, and the curing process conditions may he suitably set in accordance with the list of the back coating layer forming composition used in the coating layer formation, the type of the curing agent, and the thickness of the coating layer. For example, in a case where the coating layer is formed by using the back coating layer forming composition including polyisocyanate as the curing agent, the curing process is preferably the heating process. In a case where the curing agent is included in a layer other than the back coating layer, a curing reaction of the layer can also proceed by the curing process here. Alternatively, the curing step may be separately provided. After the curing step, the burnishing treatment may be further performed.

As described above, it is possible to obtain a magnetic tape included in the magnetic tape device according to one aspect of the invention. However, the manufacturing method described above is merely an example, the magnetic layer surface roughness Ra, the XRD intensity ratio, the vertical squareness ratio, and the logarithmic decrement of the back coating layer surface can be controlled to be in respective ranges described above by a random method capable of adjusting the magnetic layer surface roughness Ra, the XRD intensity ratio, the vertical squareness ratio, and the logarithmic decrement, and such an aspect is also included in the invention. The magnetic tape is generally accommodated in a magnetic tape cartridge and the magnetic tape cartridge is mounted in the magnetic tape device (drive). A servo pattern can also be formed in the magnetic tape by a well-known method, in order to allow head tracking servo to be performed in the drive. The drive includes at least the magnetic tape mounted on the magnetic tape cartridge, and one or more magnetic heads for recording and/or reproducing information. Even in a case where the magnetic tape is allowed to run in the drive and feeding and winding of the magnetic tape from a reel of the magnetic tape cartridge are repeated, it is possible to prevent the occurrence of the edge damage, according to the magnetic tape according to one aspect of the invention. In addition, as a running speed of the magnetic tape in the drive increases, the recording of information and reproducing of the recorded information can be performed for a short time. Here, the running speed of the magnetic tape is a relative speed of the magnetic tape and the magnetic head in the drive and is normally set in a controller of the drive. As the running speed of the magnetic tape increases, the contact state between the surface of the magnetic layer and the surface of the back coating layer tends to be unstable, and accordingly, the edge damage easily occurs. Even in such a case, it is possible to prevent the occurrence of the edge damage, according to the magnetic tape according to one aspect of the invention. The magnetic tape according to one aspect of the invention is suitably used in a drive in which the running speed of the magnetic tape is equal to or higher than 3 m/sec (for example, 3 to 20 m/sec).

EXAMPLES

Hereinafter, the invention will be described with reference to examples. However, the invention is not limited to aspects shown in the examples. "Parts" and "%" in the following description mean "parts by mass" and "% by mass", unless otherwise noted. In addition, steps and evaluations described below are performed in an environment of an atmosphere temperature of 23° C.±1° C., unless otherwise noted.

1. Manufacturing of Magnetic Tape

Example 1

A list of each layer forming composition is shown below.
List of Magnetic Layer Forming Composition
Magnetic Liquid
Plate-shape ferromagnetic hexagonal ferrite powder (M-type barium ferrite): 100.0 parts
(Activation volume: 1,500 nm$^3$)
Oleic acid: 2.0 parts
A vinyl chloride copolymer (MR-104 manufactured by Zeon Corporation): 10.0 parts
SO$_3$Na group-containing polyurethane resin: 4.0 parts
(Weight-average molecular weight: 70,000, SO$_3$Na group: 0.07 meq/g)
An amine-based polymer (DISPERBYK-102 manufactured by BYK Additives & Instruments): 6.0 parts
Methyl ethyl ketone: 150.0 parts
Cyclohexanone: 150.0 parts
Abrasive Solution
α-alumina: 6.0 parts
(BET specific surface area: 19 m$^2$/g, Mohs hardness: 9)
SO$_3$Na group-containing polyurethane resin: 0.6 parts
(Weight-average molecular weight: 70,000, SO$_3$Na group: 0.1 meq/g)
2,3-Dihydroxynaphthalene: 0.6 parts
Cyclohexanone: 23.0 parts
Projection Formation Agent Liquid
Colloidal silica: 2.0 parts
(Average particle size: 80 nm)
Methyl ethyl ketone: 8,0 parts
Lubricant and Curing Agent Liquid
Stearic acid: 3.0 parts
Stearic acid amide: 0.3 parts
Butyl stearate: 6.0 parts
Methyl ethyl ketone: 110.0 parts
Cyclohexanone: 110.0 parts
Polyisocyanate (CORONATE (registered trademark) L manufactured by Tosoh Corporation): 3.0 parts
List of Non-Magnetic Layer Forming Composition
Non-magnetic inorganic powder: α-iron oxide: 100.0 parts
(Average particle size: 10 nm, BET specific surface area: 75 m$^2$/g)
Carbon black: 25.0 parts
(Average particle size: 20 nm)
A SO$_3$Na group-containing polyurethane resin: 18.0 parts
(Weight-average molecular weight: 70,000, content of SO$_3$Na group: 0.2 meq/g)
Stearic acid: 1.0 parts
Cyclohexanone: 300.0 parts
Methyl ethyl ketone: 300.0 parts
List of Back Coating Layer Forming Composition
Non-magnetic inorganic powder: α-iron oxide: 80.0 parts
(Average particle size: 0.15 μm, BET specific surface area: 52 m$^2$/g)
Carbon black: 20.0 parts
(Average particle size: 20 nm)
A vinyl chloride copolymer: 13.0 parts
A sulfonic acid salt group-containing polyurethane resin: 6,0 parts
Phenylphosphonic acid: 3.0 parts
Cyclohexanone: 155.0 parts
Methyl ethyl ketone: 155.0 parts
Stearic acid: 3.0 parts
Butyl stearate: 3,0 parts
Polyisocyanate: 5.0 parts
Cyclohexanone: 200.0 parts
Preparation of Magnetic Layer Forming Composition
The magnetic layer forming composition was prepared by the following method.
A dispersion liquid A was prepared by dispersing (first stage) various components of the magnetic liquid with a batch type vertical sand mill by using zirconia beads having a bead diameter of 0.5 mm (first dispersion beads, density of 6.0 g/cm³) for 24 hours, and then performing filtering with a filter having a hole diameter of 0.5 μm. The used amount of zirconia beads was 10 times of the amount of the ferromagnetic hexagonal barium ferrite powder based on mass.

After that, a dispersion liquid (dispersion liquid B) was prepared by dispersing (second stage) dispersion liquid A with a batch type vertical sand mill by using diamond beads having a bead diameter shown in Table 1 (second dispersion beads, density of 3.5 g/cm³) for 1 hour, and then separating diamond beads by using a centrifugal separator. The magnetic liquid is the dispersion liquid B obtained as described above. The used amount of diamond beads was 10 times of the amount of the ferromagnetic hexagonal ferrite barium powder based on mass.

Regarding the abrasive solution, various components of the abrasive solution were mixed with each other and put in a transverse heads mill disperser together with zirconia beads having a bead diameter of 0.3 mm, so as to perform the adjustment so that a value of head volume/abrasive solution volume+bead volume) was 80%, the heads mill dispersion process was performed for 120 minutes, the liquid after the process was extracted, and an ultrasonic dispersion filtering process was performed by using a flow type ultrasonic dispersion filtering device. By doing so, the abrasive solution was prepared.

The magnetic layer forming composition was prepared by introducing the prepared magnetic liquid, the abrasive solution, the projection formation agent solution, and the lubricant and curing agent solution in a dissolver, stirring the mixture at a circumferential speed of 10 m/sec for 30 minutes, and performing a process of 3 passes at a flow rate of 7.5 kg/min with a flow type ultrasonic disperser stirring device, and filtering the mixture with a filter having a hole diameter of 1 μm.

The activation volume of the ferromagnetic hexagonal ferrite powder described above is a value calculated by performing measurement by using powder which is the same powder lot as the ferromagnetic hexagonal ferrite powder used in the preparation of the magnetic layer forming composition. The magnetic field sweep rates in the coercivity Hc measurement part at timing points of 3 minutes and 30 minutes were measured by using an oscillation sample type magnetic-flux meter (manufactured by Toei Industry Co., Ltd.), and the activation volume was calculated from the relational expression described above. The measurement was performed in the environment of 23° C. ±1° C.

Preparation of Non-Magnetic Layer Forming Composition

A non-magnetic layer forming composition was prepared by dispersing various components of the non-magnetic layer forming composition with a batch type vertical sand mill by using zirconia beads having a bead diameter of 0.1 mm for 24 hours, and then performing filtering with a filter having a hole diameter of 0.5 μm.

Preparation of Back Coating Layer Forming Composition

Components among various components of the back coating layer forming composition except a lubricant (stearic acid and butyl stearate), polyisocyanate, arid 200.0 parts of cyclohexanone were kneaded and diluted by an open kneader, and subjected to a dispersion process of 12 passes, with a transverse beads mill disperser and zirconia beads having a bead diameter of 1 mm, by setting a bead filling percentage as 80 volume %, a circumferential speed of rotor distal end as 10 m/sec, and a retention time for 1 pass as 2 minutes. After that, the remaining components were added and stirred with a dissolver, the obtained dispersion liquid was filtered with a filter having a hole diameter of 1 μm and a back coating layer forming composition was prepared.

Manufacturing Method of Magnetic Tape

A magnetic tape was manufactured by the specific aspect shown in FIG. 4. The magnetic tape was specifically manufactured as follows.

A support made of polyethylene naphthalate having a thickness of 4.50 μm was sent from the sending part, and the non-magnetic layer forming composition was applied to one surface thereof so that the thickness after the drying becomes 1.00 μm in the first coating part and was dried in the first heating process zone (atmosphere temperature of 100° C.) to form a coating layer.

Then, the magnetic layer forming composition was applied onto the non-magnetic layer so that the thickness after the drying becomes 0.10 μm in the second coating part, and a coating layer was formed. A homeotropic alignment process was performed in the alignment zone by applying a magnetic field having strength shown in Table 1 in a vertical direction with respect to the surface of the coating layer, while the formed coating layer is wet. Then, the coating layer was dried in the second heating process zone (atmosphere temperature of 100° C.).

After that, in the third coating part, the back coating layer forming composition was applied to the surface of the support made of polyethylene naphthalate on a side opposite to the surface where the non-magnetic layer and the magnetic layer are formed, so that the thickness after the drying becomes 0.50 μm, to form a coating layer, and the cooling step was performed by causing the coating layer to pass through a cooling zone in which the atmosphere temperature was adjusted to 0° C. for the staying time shown in Table 1, while the formed coating layer is wet. After that, the coating layer was dried in the third heating process zone atmosphere temperature of 100° C.).

The magnetic tape obtained as described above was slit to have a width of ½ inches (0.0127 meters), and the burnishing treatment and the wiping treatment were performed with respect to the surface of the coating layer of the back coating layer forming composition. The burnishing treatment and the wiping treatment were performed by using a commercially available polishing tape (product name: MA22000 manufactured by Fujifilm Corporation, abrasive: diamond/$Cr_2O_3$/red oxide) as the polishing tape, a commercially available sapphire blade (manufactured by Kyocera Corporation, a width of 5 mm, a length of 35 mm, and a tip angle of 60 degrees) as the grinding blade, and a commercially available wiping material (product name WRP736 manufactured by Kuraray Co., Ltd.) as the wiping material, in a treatment device having a configuration disclosed in FIG. 1 of JP1994-52544A (JP-H06-52544A). For the treatment conditions, the treatment conditions disclosed in Example 12 of JP1994-52544A (JP-H06-52544A).

After the burnishing treatment and the wiping treatment, a calender process (surface smoothing treatment) was performed with a calender roll configured of only a metal roll, at a speed of 80 m/min, linear pressure of 300 kg/cm (294 kN/m), by using a calender roll having a surface temperature shown in Table 1.

Then, a magnetic tape was obtained by performing the curing process (heat treatment) in an environment of an atmosphere temperature of 70° C. for 36 hours, and a servo pattern was formed on the magnetic layer of the obtained magnetic tape with a commercially available servo writer.

By doing so, the magnetic tape of Example 1 was obtained.

Examples 2 to 8, Comparative Examples 1 to 8, and Reference Examples 1 and 2

A magnetic tape was manufactured in the same manner as in Example 1, except that various items shown in Table 1 were changed as shown in Table 1.

In Table 1, in the comparative examples and the reference examples in which "none" is shown in a column of the dispersion heads and a column of the time, the magnetic layer forming composition was prepared without performing the second stage in the magnetic liquid dispersion process.

In Table 1, in the comparative examples and the reference examples in which "none" is shown in a column of the homeotropic alignment process magnetic field strength, the magnetic layer was formed without performing the alignment process.

In Table 1, in the comparative examples and the reference examples in which "not performed" is disclosed in a column of the cooling zone staying time of the back coating layer forming step and a column of the burnishing treatment before the curing process, a magnetic tape was manufactured by a manufacturing step not including the cooling zone in the back coating layer forming step and riot performing the burnishing treatment and the wiping treatment.

2. Various Evaluations (1) XRD Intensity Ratio

A tape sample was cut out from the manufactured magnetic tape.

Regarding the cut-out tape sample, the surface of the magnetic layer was irradiated with X-ray by using a thin film X-ray diffraction device (Smart Lab manufactured by Rigaku Corporation), and the In-Plane XRD was performed by the method described above.

The peak intensity Int(114) of the diffraction peak of the (114) plane and the peak intensity Int(110) of the diffraction peak of a (110) plane of a hexagonal ferrite crystal structure were obtained from the X-ray diffraction spectra obtained by the In-Plane XRD, and the XRD intensity ratio (Int(110)/Int(114)) was calculated.

(2) Vertical Squareness Ratio

A vertical squareness ratio of the manufactured magnetic tape was obtained by the method described above using an oscillation sample type magnetic-flux meter (manufactured by Toei Industry Co., Ltd.).

(3) Center Line Average Surface Roughness Ra Measured Regarding Surface of Magnetic Layer The measurement regarding a measurement area of 40 μm×40 μm in the surface of the magnetic layer of the magnetic tape was performed with an atomic force microscope (AFM, Nanoscope 4 manufactured by Veeco Instruments, Inc.) in a tapping mode, and a center line average surface roughness Ra was acquired. RTESP-300 manufactured by BRUKER is used as a probe, a scan speed (probe movement speed) was set as 40 m/sec, and a resolution was set as 512 pixel×512 pixel.

(4) Logarithmic Decrement Measured Regarding Surface of Back Coating Layer

The logarithmic decrement of the back coating layer surface of each magnetic tape of the example, the comparative examples, and the reference examples was acquired by the method described above by using a rigid-body pendulum type physical properties testing instrument RPT-3000 W manufactured by A&D Company, Limited (pendulum: rigid-body pendulum FRB-100 manufactured by A&D Company, weight: not employed, round-bar type cylinder edge: RBP-040 manufactured by A&D Company, substrate: glass substrate, a rate of temperature increase of substrate: 5 QC/min) as the measurement device.

A commercially available slide glass was cut into a size of 25min (short side)×50mm (long side) and employed as the glass substrate. In a state where the magnetic tape was placed on the center part of the glass substrate so that the longitudinal direction of the magnetic tape was parallel to the direction of the short side of the glass substrate, four corners of the magnetic tape were fixed on the glass substrate with a fixing tape (Kapton tape manufactured by Du Pont-Toray Co., Ltd.). Then, portions of the magnetic tape protruding from the glass substrate were cut out. In the above manner, the measurement sample was placed on a glass substrate by being fixed at 4 portions as shown in FIG. 1. An adsorption time was set as 1 second, a measurement interval was set as 7 to 10 seconds, a displacement-time curve was drawn regarding the 86-th measurement interval, and the logarithmic decrement was acquired by using this curve. The measurement was performed in the environment of relative humidity of approximately 50%.

(5) Evaluation of Edge Damage

A magnetic tape cartridge accommodating each magnetic tape (magnetic tape total length of 500 m) of the examples, the comparative examples, and the reference examples was set in a drive of Linear Tape-Open Generation 7 (LTO-G7) manufactured by IBM, and the magnetic tape was subjected to reciprocating running 1,500 times at tension of 0.6 N and a running speed of 5 m/sec, while bringing the surface of the magnetic layer into contact with the magnetic head for sliding.

The magnetic tape cartridge after the running was set in a reference drive (LTO-G7 drive manufactured by IBM), and the magnetic tape is allowed to run to perform the recording and reproducing. A reproduction signal during the running was introduced to an external analog/digital (AD) conversion device. A signal having a reproducing signal amplitude which is decreased 70% or more than an average (average of measured values at each track) respectively in a track closest to one edge of the magnetic tape and a track closest to the other edge thereof was set as a missing pulse, a generation frequency (number of times of the generation) thereof was divided by the total length of the magnetic tape to obtain a missing pulse generation frequency per unit length of the magnetic tape (per 1 m) (unit: times/m).

As the edge damage heavily occurs, the missing pulse generation frequency obtained by the method described above increases. Accordingly, the missing pulse generation frequency obtained by the method described above becomes an index for the edge damage. In a case where the missing pulse generation frequency is equal to or smaller than 10.0 times/m, it is possible to determine that the occurrence of the edge damage is prevented to a sufficient practical level. The position where the edge damage occurs is not constant, and therefore, in this evaluation, the measurement result having a large number of missing pulses was used as the missing pulse generation frequency, among the measurement result in a track closest to one edge and the measurement result in a track closest to the other edge, and was shown in Table 1.

The results described above are shown in Table 1.

TABLE 1

| | Magnetic liquid dispersion process second stage | | | | | | |
|---|---|---|---|---|---|---|---|
| | Dispersion beads | | | | | | |
| | Kind | Bead diameter | Used amount (mass of beads with respect to mass of ferromagnetic hexagonal ferrite powder) | Time | Homeotropic alignment process magnetic field strength | Surface temperature of calender roll | Back coating layer forming step Cooling zone staying time |
| Reference Example 1 | None | None | None | None | None | 80° C. | Not performed |
| Reference Example 2 | None | None | None | None | None | 95° C. | Not performed |
| Comparative Example 1 | None | None | None | None | None | 100° C. | Not performed |
| Comparative Example 2 | None | None | None | None | None | 110° C. | Not performed |
| Comparative Example 3 | Diamond | 500 nm | 10 times | 1 h | 0.15 T | 100° C. | Not performed |
| Comparative Example 4 | None | None | None | None | None | 100° C. | 1 second |
| Comparative Example 5 | None | None | None | None | 0.15 T | 100° C. | 1 second |
| Comparative Example 6 | None | None | None | None | 0.30 T | 100° C. | 1 second |
| Comparative Example 7 | Diamond | 500 nm | 10 times | 1 h | 1.00 T | 100° C. | 1 second |
| Comparative Example 8 | Diamond | 500 nm | 10 times | 1 h | None | 100° C. | 1 second |
| Example 1 | Diamond | 500 nm | 10 times | 1 h | 0.15 T | 100° C. | 1 second |
| Example 2 | Diamond | 500 nm | 10 times | 1 h | 0.20 T | 100° C. | 1 second |
| Example 3 | Diamond | 500 nm | 10 times | 1 h | 0.30 T | 100° C. | 1 second |
| Example 4 | Diamond | 500 nm | 10 times | 1 h | 0.50 T | 100° C. | 1 second |
| Example 5 | Diamond | 500 nm | 20 times | 1 h | 0.15 T | 100° C. | 1 second |
| Example 6 | Diamond | 500 nm | 10 times | 1 h | 0.30 T | 110° C. | 1 second |
| Example 7 | Diamond | 500 nm | 10 times | 1 h | 0.30 T | 110° C. | 180 seconds |
| Example 8 | Diamond | 500 nm | 10 times | 1 h | 0.30 T | 110° C. | 240 seconds |

| | Back coating layer forming step Burnishing treatment before curing process | Logarithmic decrement of back coating layer surface | XRD intensity ratio Int(110)/Int(114) | Vertical squareness ratio | Magnetic layer surface roughness Ra | Missing pulse generation frequency (times/m) |
|---|---|---|---|---|---|---|
| Reference Example 1 | Not performed | 0.070 | 0.2 | 0.55 | 2.5 nm | 3 |
| Reference Example 2 | Not performed | 0.070 | 0.2 | 0.55 | 2.0 nm | 4 |
| Comparative Example 1 | Not performed | 0.070 | 0.2 | 0.55 | 1.8 nm | 13 |
| Comparative Example 2 | Not performed | 0.070 | 0.2 | 0.55 | 1.5 nm | 18 |
| Comparative Example 3 | Not performed | 0.070 | 0.5 | 0.70 | 1.8 nm | 12 |
| Comparative Example 4 | Performed | 0.058 | 0.2 | 0.55 | 1.8 nm | 12 |
| Comparative Example 5 | Performed | 0.058 | 3.8 | 0.63 | 1.8 nm | 12 |
| Comparative Example 6 | Performed | 0.058 | 5.0 | 0.75 | 1.8 nm | 12 |
| Comparative Example 7 | Performed | 0.058 | 6.1 | 0.90 | 1.8 nm | 12 |
| Comparative Example 8 | Performed | 0.058 | 0.3 | 0.66 | 1.8 nm | 12 |
| Example 1 | Performed | 0.058 | 0.5 | 0.70 | 1.8 nm | 5 |
| Example 2 | Performed | 0.058 | 1.5 | 0.75 | 1.8 nm | 4 |
| Example 3 | Performed | 0.058 | 2.3 | 0.80 | 1.8 nm | 4 |
| Example 4 | Performed | 0.058 | 4.0 | 0.85 | 1.8 nm | 4 |
| Example 5 | Performed | 0.058 | 0.7 | 0.83 | 1.8 nm | 5 |
| Example 6 | Performed | 0.058 | 2.3 | 0.80 | 1.5 nm | 6 |
| Example 7 | Performed | 0.030 | 2.3 | 0.80 | 1.5 nm | 3 |
| Example 8 | Performed | 0.015 | 2.3 | 0.80 | 1.5 nm | 3 |

With the comparison of Reference Examples 1 and 2 and. Comparative Examples 1 to 8, it is possible to confirm that the edge damage significantly occurs, in a magnetic tape having the magnetic layer surface roughness Ra equal to or smaller than 1.8 nm (Comparative Examples 1 to 8).

In addition, with the comparison of Examples 1 to 8 and Comparative Examples 1 to 8, it is possible to confirm that the occurrence of the edge damage in the magnetic tape having the magnetic layer surface roughness Ra equal to or smaller than 1.8 nm can be prevented by setting the XRD intensity ratio, the vertical squareness ratio, and the logarithmic decrement of the back coating layer surface to be in the respective ranges described above.

One aspect of the invention can be effective in the technical fields of magnetic tapes such as back-up tapes.

What is claimed is:

1. A magnetic tape comprising:
   a non-magnetic support;
   a magnetic layer including ferromagnetic powder, non-magnetic powder, and a binding agent on one surface side of the non-magnetic support; and
   a back coating layer including non-magnetic powder and a binding agent on the other surface side of the non-magnetic support,
   wherein the ferromagnetic powder is ferromagnetic hexagonal ferrite powder,
   a center line average surface roughness Ra measured regarding a surface of the magnetic layer is equal to or smaller than 1.8 nm,
   an intensity ratio Int(110)/Int(114) of a peak intensity Int(110) of a diffraction peak of a (110) plane with respect to a peak intensity Int(114) of a diffraction peak of a (114) plane of a hexagonal ferrite crystal structure obtained by an X-ray diffraction analysis of the magnetic layer by using an In-Plane method is 0.5 to 4.0,
   a vertical squareness ratio of the magnetic tape is 0.65 to 1.00, and
   a logarithmic decrement acquired by a pendulum viscoelasticity test performed regarding a surface of the back coating layer is equal to or smaller than 0.060.

2. The magnetic tape according to claim 1,
   wherein the logarithmic decrement is 0.010 to 0.060, and
   the logarithmic decrement is determined by the following method:
   securing a measurement sample of the magnetic tape with the measurement surface, which is the surface on the backcoat layer side, facing upward on a substrate in a pendulum viscoelasticity tester;
   disposing a columnar cylinder edge which is 4 mm in diameter and equipped with a pendulum 13 g in weight on the measurement surface of the measurement sample such that the long axis direction of the columnar cylinder edge runs parallel to the longitudinal direction of the measurement sample;
   raising the surface temperature of the substrate on which the measurement sample has been positioned at a rate of less than or equal to 5° C./min up to 80° C.;
   inducing initial oscillation of the pendulum;
   monitoring the displacement of the pendulum while it is oscillating to obtain a displacement-time curve for a measurement interval of greater than or equal to 10 minutes; and
   obtaining the logarithmic decrement Δ from the following equation:

$$\Delta = \frac{\ln\left(\frac{A_1}{A_2}\right) + \ln\left(\frac{A_2}{A_3}\right) + \ldots \ln\left(\frac{A_n}{A_{n+1}}\right)}{n}$$

wherein the interval from one minimum displacement to the next minimum displacement is adopted as one wave period; the number of waves contained in the displacement-time curve during one measurement interval is denoted by n, the difference between the minimum displacement and the maximum displacement of the $n^{th}$ wave is denoted by An, and the logarithmic decrement is calculated using the difference between the next minimum displacement and maximum displacement of the $n^{th}$ wave ($A_{n+1}$ in the above equation).

3. The magnetic tape according to claim 1,
   wherein the center line average surface roughness Ra measured regarding the surface of the magnetic layer is 1.2 nm to 1.8 nm.

4. The magnetic tape according to claim 2,
   wherein the center line average surface roughness Ra measured regarding the surface of the magnetic layer is 1.2 nm to 1.8 nm.

5. The magnetic tape according to claim 1,
   wherein the vertical squareness ratio of the magnetic tape is 0.65 to 0.90.

6. The magnetic tape according to claim 2,
   wherein the vertical squareness ratio of the magnetic tape is 0.65 to 0.90.

7. The magnetic tape according to claim 3,
   wherein the vertical squareness ratio of the magnetic tape is 0.65 to 0.90.

8. The magnetic tape according to claim 4,
   wherein the vertical squareness ratio of the magnetic tape is 0.65 to 0.90.

9. The magnetic tape according to claim 1, further comprising:
   a non-magnetic layer including non-magnetic powder and a binding agent between the non-magnetic support and the magnetic layer.

* * * * *